(12) United States Patent
Tsugaru et al.

(10) Patent No.: US 8,419,304 B2
(45) Date of Patent: Apr. 16, 2013

(54) PRINTER AND DC MOTOR SPEED CONTROL DEVICE

(75) Inventors: Hiroyuki Tsugaru, Saitama (JP); Gen Matsushima, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1088 days.

(21) Appl. No.: 11/913,269

(22) PCT Filed: Oct. 30, 2006

(86) PCT No.: PCT/JP2006/321619
§ 371 (c)(1),
(2), (4) Date: Oct. 31, 2007

(87) PCT Pub. No.: WO2007/097069
PCT Pub. Date: Aug. 30, 2007

(65) Prior Publication Data
US 2009/0026992 A1    Jan. 29, 2009

(30) Foreign Application Priority Data
Feb. 27, 2006   (JP) .................................. 2006-50084

(51) Int. Cl.
*B41J 11/42*  (2006.01)
*B41J 29/38*  (2006.01)

(52) U.S. Cl.
USPC ..... 400/583.2; 400/578; 400/582; 318/400.4; 318/400.39

(58) Field of Classification Search .................. 400/578, 400/582, 583.2; 250/233; 318/400.4, 400.39
See application file for complete search history.

(56) References Cited

U.S. PATENT DOCUMENTS 4,806,034 A * 2/1989 Plummer ...................... 400/279
5,497,748 A    3/1996 Ott et al.
(Continued)

FOREIGN PATENT DOCUMENTS

JP    60238717 A  * 11/1985
JP    01239463 A  *  9/1989
(Continued)

OTHER PUBLICATIONS

Chinese Office Action dated Nov. 27, 2009, issued in corresponding Chinese Patent Application No. 2006800055506.
(Continued)

*Primary Examiner* — Daniel J Colilla
(74) *Attorney, Agent, or Firm* — Westerman, Hattori, Daniels & Adrian, LLP

(57) ABSTRACT

In speed control that is performed within a single operating cycle of a printer, three-level control of ON control, OFF control, and chopper control, is performed in place of the two-level control of ON control and OFF control, to effectively suppress speed variations due to load variations within a single operating cycle, even in small printers provided with DC motors having small output torques. In a printer comprising a DC motor 7, a paper feeding unit 5 that includes a paper feeding roller that uses the DC motor as the driving source, and a printing mechanism unit 2, for printing, in use of the printing mechanism unit 2, onto paper that is advanced by a specific amount by the paper feeding unit 5, an encoder 10 for outputting pulse signals according to the rotation of the DC motor 7 is provided. The encoder 10 is provided with a pulse forming region for forming a pulsed signal, on the periphery of an encoder plate, where this pulse forming region is provided with a non-uniform spacing region in a section within a uniform spacing region.

7 Claims, 18 Drawing Sheets

U.S. PATENT DOCUMENTS

2003/0128002 A1     7/2003    Kokubo et al.
2005/0253052 A1*   11/2005   Martenson et al. ...... 250/231.13
2006/0088338 A1*    4/2006    Matsuda et al. .............. 399/167

FOREIGN PATENT DOCUMENTS

| | | | |
|---|---|---|---|
| JP | 2-107120 A | | 4/1990 |
| JP | 03015718 A | * | 1/1991 |
| JP | 7-500164 A | | 1/1995 |
| JP | 2001004409 A | * | 1/2001 |
| JP | 2001-130069 A | | 5/2001 |
| JP | 2003-186545 A | | 7/2003 |
| JP | 2005-32567 A | | 2/2005 |
| JP | 2005-138408 A | | 6/2005 |
| WO | 93-07449 A1 | | 4/1993 |

OTHER PUBLICATIONS

Notification of Transmittal of Translation of the International Preliminary Report on Patentability (Form PCT/IB/338) of International Application No. PCT/JP2006/321619 mailed Sep. 12, 2008 with Forms PCT/IB/373 and PCT/ISA/237.

International Search Report of PCT/JP2006/321619, date of mailing Nov. 28, 2006.

\* cited by examiner

FIG. 5A
ACTUAL SPEED
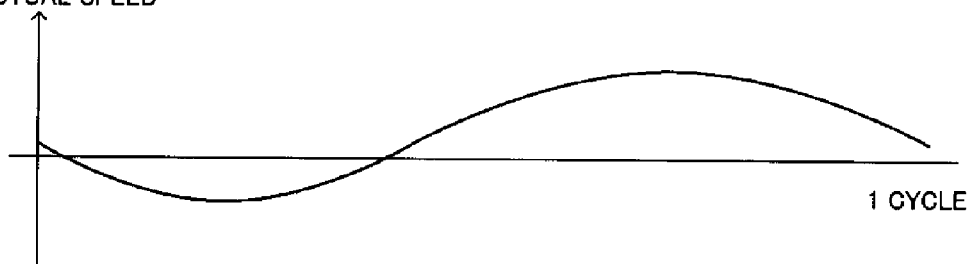
1 CYCLE
FIG. 5B
DETECTED SPEED
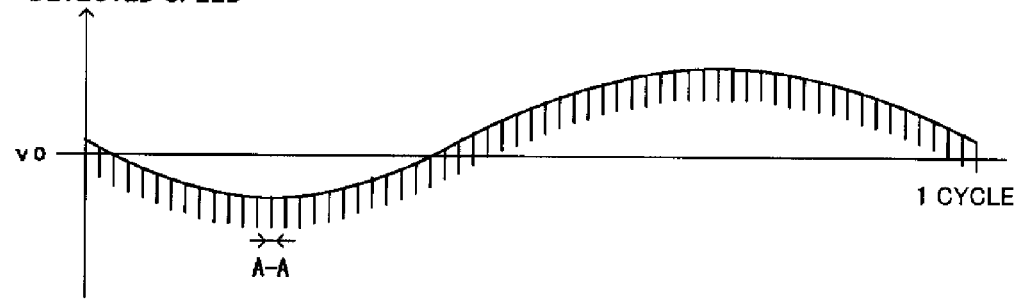
1 CYCLE
A-A
FIG. 5C
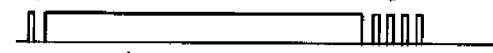  
ON
FIG. 5D
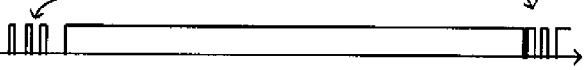
OFF
FIG. 5E
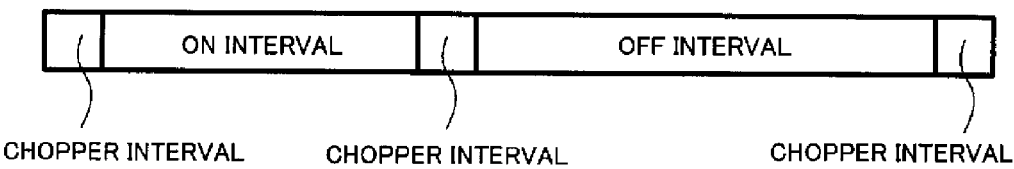
CHOPPER INTERVAL    CHOPPER INTERVAL    CHOPPER INTERVAL

PRIOR ART

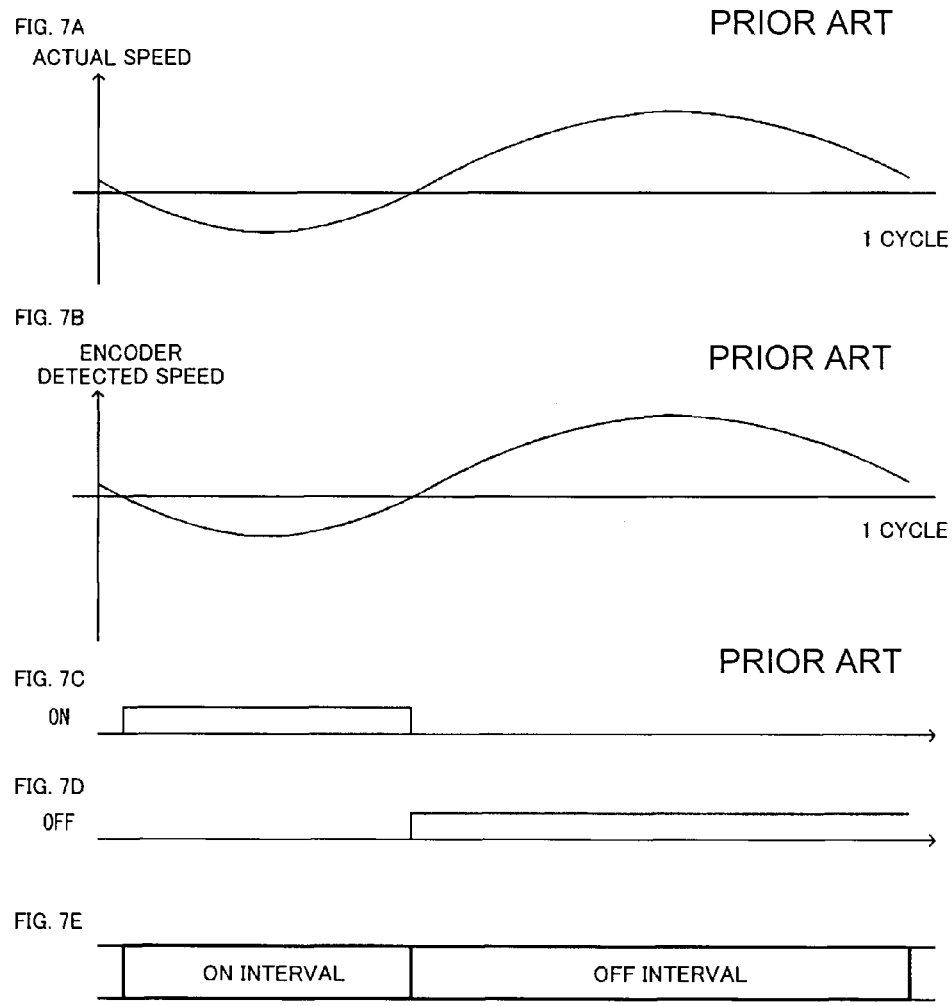

LOAD

ACTUAL SPEED

ENCODER DETECTED SPEED (WITH REMOVED SLIT)

ACTUAL SPEED (CONTROLLED)

ENCODER DETECTED SPEED

ACTUAL SPEED

ENCODER DETECTED SPEED

ENCODER DETECTED SPEED

ACTUAL SPEED

ENCODER DETECTED SPEED

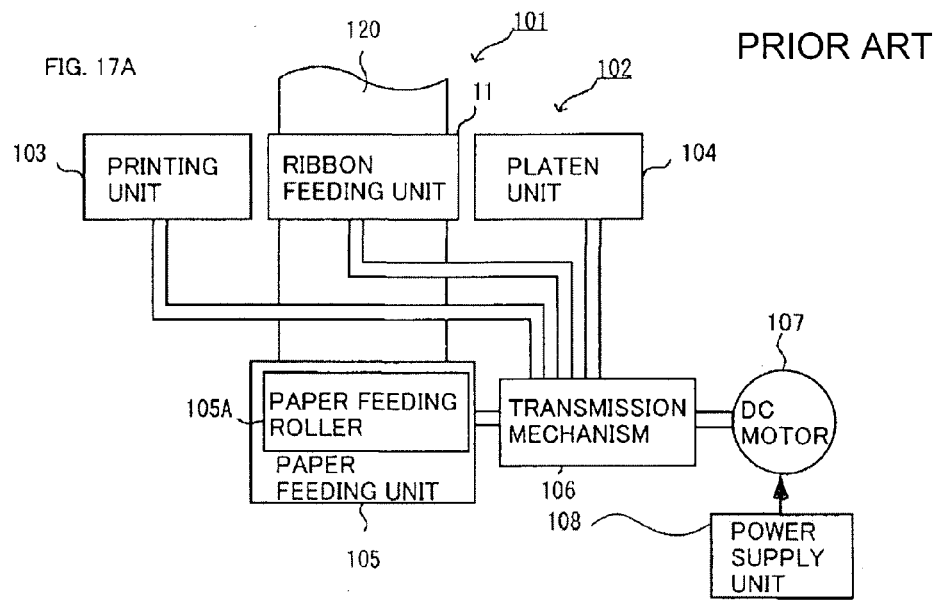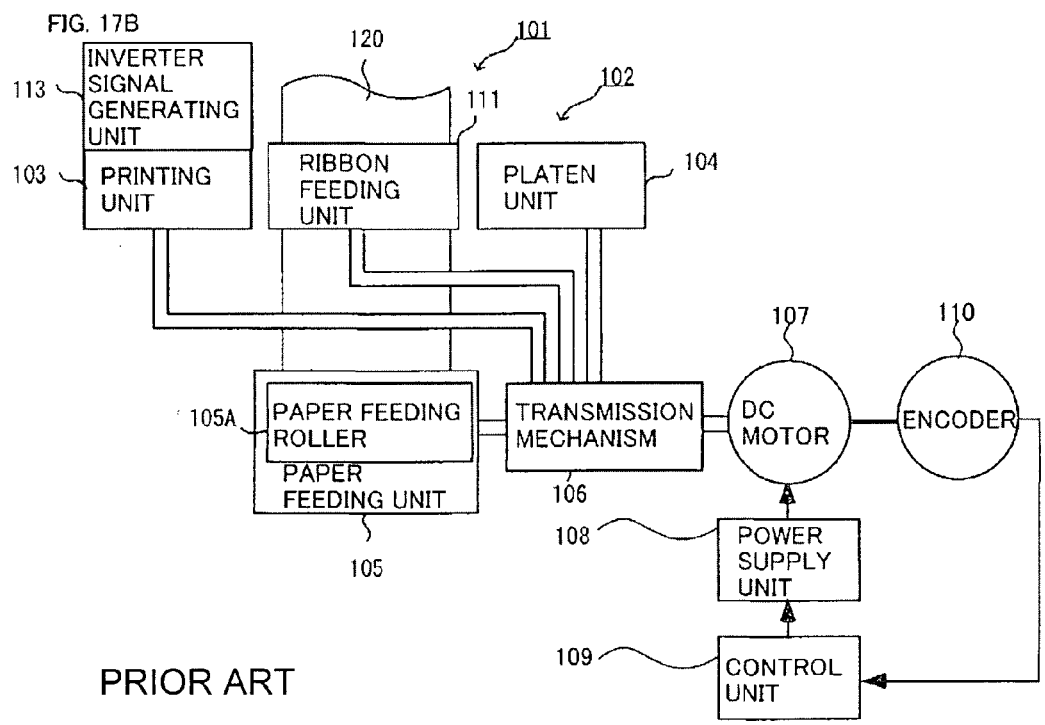

LOAD

ACTUAL SPEED $\Delta vo$

ENCODER DETECTED SPEED

ACTUAL SPEED (CONTROLLED)

$\Delta vc$

PRIOR ART

PRINTER AND DC MOTOR SPEED CONTROL DEVICE

TECHNICAL FIELD

The present invention relates to a printer and to a DC motor speed control device used in the printer.

BACKGROUND ART

A variety of printers are known as output devices for data processing devices and the like. DC motors that are suitable for small printers are used as the driving source for driving these printers. These printers have structures provided with a paper feeding unit for feeding the printer paper, a printing unit for printing characters onto the printer paper, and a printing mechanism unit that includes a ribbon feeding unit for feeding a ribbon between the printing unit and the printer paper, where the paper feeding unit and the printer mechanism unit are driven by a single DC motor.

Typically, in a printer it is desirable to minimize the difference in speed between the printing speed of the printing mechanism unit and the paper feed speed of the paper feeding unit in order to reduce the printing misalignment. For example, if the paper feed speed by the paper feeding unit is lower than the printing speed up by the printing mechanism unit, then the paper will be fed before an entire line worth of type is prepared in the printing mechanism unit side, which will cause printing misalignment.

Typically small printers omit the mechanism for speed control, miniaturizing the units by sacrificing printing precision, through using only default values for the printing speed in the printing mechanism unit and for the paper feed speed in the paper feeding unit.

FIG. 17 is a schematic diagram for explaining a conventional printer. In FIG. 17A the printer 101 is provided with a printing mechanism unit 102 for performing the printing, and a paper feeding unit 105 for feeding printer paper 120. The printing mechanism unit 102 is provided with a printing unit 103, which has a type roller, and the like, a platen unit 104 which presses against the type roller, with an ink ribbon (not shown) interposed between the type roller and a printer paper 120, and a ribbon feeding unit 111 for feeding an ink ribbon between the printing unit and the printer paper. The paper feeding unit 105 is provided with a paper feeding roller at 105A, where the paper feeding roller 105A is driven rotationally by a DC motor 107 through a transmission mechanism 106, comprising gears, and the like. Moreover, the printing unit 103, the platen unit 104, and the ribbon feeding unit 111 are also driven by the DC motor 107 through the transmission mechanism 106. The DC motor at 107 receives a supply of power from a power supply 108. (See, for example, Patent Document 1.)

Typically, in printers that use DC motors as the driving source, there is a tendency for the rotational speed of the DC motor to gradually increase. This is because, from the perspective of the DC motor, the load decreases with the passage of time, and because of changes in the characteristics of the DC motor.

The load, when viewed from the DC motor, includes the load of the mechanical system parts, such as the transmission mechanism, such as the gears and the like provided between the DC motor and the paper feeder roller, and the friction, etc., in the bearings in the paper feeder roller, and the like. The load of the mechanical system has a tendency to diminish gradually with the passage of time. Because of this, when driven by a DC motor with a constant torque, there will be a tendency for the speed of rotation to increase due to the reduction in the load of the mechanical system parts.

Moreover, the brushes provided in the DC motor are subjected to friction due to the rotation, and a shift in position occurs due to a shift in the contact points, causing the electrical characteristics of the DC motor to change. The changes in the electrical characteristics cause the speed of rotation to increase.

Normally, in small printers, the paper feeding speed in the paper feeding unit is set so that the difference in the rotational speed of the printing mechanism will be within a tolerable range in light of the change in the rotational speed of the paper feeding unit over time in this way. Although the difference in speed due to changes with the passage of time can be in a tolerable range when the paper feeding speed is low, when the paper feeding speed is high it is difficult to keep the difference in speed within the tolerable range. This is because the difference in speed is proportional to the speed, and thus is greater the higher the speed. Consequently, printers that use DC motors as the driving source have a problem in that the rotational speed gradually increases with the passage of time, leading to printing misalignment. In particular, there is a problem in that the printing misalignment is greater when high-speed printing is performed.

Control so as to ensure consistency in the paper feeding speed has been proposed in response to this type of problem that occurs with small printers. FIG. 17B is an example of a structure for controlling the paper feeding to a constant speed. In this example structure, the speed of the paper feeding roller is detected, and feedback control is performed so as to apply to the DC motor an electric current value that is increased or decreased depending on the deviation from a reference value. The rotational speed of the paper feeding roller 105A is detected by an encoder 110, where the voltage that is supplied to a power supply unit 108 is controlled depending on a control unit 109 that is based on the detected signal, thereby maintaining a constant rotational speed for the DC motor 107. (See Patent Document 2.)

Patent Document 1: Japanese Unexamined Patent Application Publication 2005-138408
Patent Document 2: Japanese Unexamined Patent Application Publication 2001-130069
Patent Document 3: Japanese Unexamined Patent Application Publication 2005-35267

DISCLOSURE OF THE INVENTION

Variability in loads in printers includes long-term variability that varies over extended periods of time, and short-term load variability wherein the load varies within a single cycle of the printer operation.

In the aforementioned small printers, one line of text is printed through a single operating cycle including a character selecting operation, a ribbon feeding operation, a printing operation, a paper feeding operation, and a resetting operation, where this operating cycle is repeated in order to print multiple lines.

Note that in the character selecting operation in a single operating cycle, type wheels, which are supported on a type wheel shaft so as to be able to slide and rotate, is rotated to select the desired character from the characters provided on the type wheels, and is locked at the printing position. Next, in the ribbon feeding operation, a specific amount of ribbon is fed, and then in the typing operation, a platen is pressed against the type wheels, with the printing paper interposed therebetween, to print one line of text. At this time, the type wheels and type wheel support shaft are in a stationary state.

After one line of printing has been completed, then the printing paper is advanced by one line worth, after which the locks on the type wheels are released, and a resetting operation is performed to position the type wheels in a reference position relative to the type wheel shaft. (For the operation of the printing device, see Patent Document 3.)

This series of operations is performed through switching the DC motor power transmission using a clutch and a series of gears.

In each of the operations described above, the magnitudes of the loads are different. For example, in the printing process the drive transmission for rotating the heavy type wheels is disconnected, so the load is lighter. In the character selecting process, the load is larger during the stage wherein the type wheels are rotated, and then, when the type wheels are stopped and the sliding and rotation on the type wheel shaft is started, the force of friction is added, and thus the load is increased even more. In the following resetting process, all of the type wheels are slid and rotated on the type wheel shaft, and thus the load is at a maximum. In this way, the printer load varies within a single operating cycle, where the speed of the motor also varies depending on the changes in load.

In the character selecting process, in order to stop the type wheels with the timing for selecting the desired characters, solenoids are driven to move fastening levers to engage the type wheels. Because of this, if the motor speed were to vary, then the speed of the type wheel would vary, which would cause a shift in the position of the character to be selected with the specific timing with which the solenoid is driven, thus selecting the incorrect character (such as the adjacent character), resulting in printing an incorrect character.

While control of the rotational speed of the DC motor using the detection signal of the aforementioned encoder is effective when it comes to the variability in load that occurs over an extended period of time, this control is not necessarily adequate for the variations in load that occur within a single operating cycle when the printer is operated, and in printers wherein there are large variations in load during a single operating cycle, such as in a small printer, there are problems in terms of large variations in speed during the single operating cycle. Note that a single operating cycle of the printer corresponds to the operations that are performed, for example, as the printer prints a single line.

FIG. 18 is a diagram for explaining the load and the speed in conventional speed control. The printer has load variation as shown in FIG. 18A during a single operating cycle of the printing operation. When the DC motor is driven with a constant torque when there is this load variation, the actual speed of the DC motor will decrease during the period wherein the load is large, and the actual speed of the DC motor will increase during the period wherein the load is small. FIG. 18B illustrates the actual speed variation in the DC motor during a single operating cycle, where $\Delta vo$ illustrates the amplitude of variation in the actual speed of the DC motor prior to control. FIG. 18C illustrates schematically the detected speed of the DC motor, detected by an encoder.

The DC motor speed control performs two-level control, with ON control that increases the rotational speed of the DC motor by supplying electric power to the DC motor when the detected speed of the DC motor is less than a reference speed, and OFF control for stopping the supply of electric power to the DC motor when the detected speed of the DC motor is greater than a reference speed.

In the case wherein the DC motor has an adequately large output torque, it is possible to suppress speed variation by controlling the driving of the DC motor, using the aforementioned two-level control, depending on the speed of rotation detected by the encoder. However, when the output torque of the DC motor is small and inadequate to suppress the load variation, then it will be difficult to fully suppress the range of variation of the actual speed of the DC motor. That is, with small output torques, time is required to be able to control the speed of rotation to a specific speed, making it difficult to adequately reduce the variation amplitude of the actual speeds of the DC motor within the period of a single operating cycle.

Normally, the DC motors that are equipped in small printers do not have adequately large torque to handle the load variation, and thus it is difficult to fully suppress the range of variation of the actual speed of the DC motor. FIG. 18D illustrates schematically the variation amplitude $\Delta vc$ of the actual speed of the DC motor after control is implemented.

Moreover, in speed variation due to load variation, normally there is both a period of time wherein the speed is higher than the reference speed, and a period of time wherein the speed is lower than a reference speed, within a single operating cycle. Because of this, in speed control, control for increasing the rotational speed and control for decreasing the rotational speed are performed within a single cycle, where control is performed over the single cycle operation unit. Because of this, even if the speed control were performed repetitively by the single cycle operation unit, there would be no suppression in the long term of the speed variation due to load variation.

Moreover, the responsiveness of the DC motor control system depends on the DC motor drive characteristics and on the responsiveness of the control circuitry. When the DC motor drive characteristics and the control circuit have poor responsiveness, then it may not be possible to adequately handle variations within a single operating cycle of the printer using acceleration control using two-level control of ON control and OFF control.

Performing speed control with higher precision through the performance of chopper control is also known; however, in performing chopper control there is the need for large output torques, so chopper control is not possible with the output torques of DC motors provided in small printers.

With the foregoing view, it is an object of the present invention to solve the conventional problem by controlling speed variation due to load variation within a single operating cycle in a DC motor and in a printer provided with a DC motor. A further object of the present invention is to control the speed variation due to load variation within a single operating cycle even with a DC motor having a small output torque.

An object is to reduce the number of misprinted characters, caused by motor speed variations, in a printer provided with a DC motor.

The printer and motor speed control device of the present invention performs, in speed control that is performed within a single operating cycle of a printer, three-level control of ON control, OFF control, and chopper control, rather than the two-level control of ON control and OFF control, to suppress effectively speed variation due to load variation within a single operating cycle, even in small printers equipped with DC motors having small output torques. Note that operations that are performed in a single operating cycle of the printer correspond, for example, to the operations that are performed by the printer in printing one line of text.

The present invention includes, as aspects for achieving the three-level control, comprising ON control, OFF control, and chopper control, a first aspect that is performed using primarily an encoder hardware structure, and a second aspect that is performed using primarily signal processing of a speed signal.

The first aspect of the present invention relates to a structure for forming encoder pulse signals, where, in an encoder that detects the rotational speed of the DC motor, the spacing of the pulse signals for detecting the speed, outputted by the encoder is non-uniform.

When the rotational speed of the DC motor is detected using the encoder of this aspect, the spacing of the pulse signals detected by the encoder is non-uniform, so that the pulse signals detected and outputted over a single rotation will have non-uniform signal spacing even when the DC motor is rotating at a constant speed. In the non-uniform signal spacing intervals, the pulse signals outputted by the encoder aspect speed signals indicating speeds that are different from the actual speeds of the DC motor. Consequently, even if the DC motor were rotating at a constant speed, pulse signals indicating a speed other than the actual speed would be outputted by the encoder during a portion of the interval for one revolution.

The DC motor rotates multiple times during the interval of a single operating cycle of the printer, where the encoder normally rotates once during the interval of one rotation of the DC motor. Consequently, the encoder rotates multiple times during the interval of a single operating cycle of the printer. Note that while the encoder typically rotates once during one rotation of the DC motor, this need not necessarily be a single rotation.

As described above, an encoder provided by the first aspect of the present invention includes an interval over which pulse signals indicating the actual speed are outputted, and an interval wherein pulse signals that are different from the actual speed are outputted, during one rotation of the encoder. Because of this, the encoder rotates multiple times during a single operating cycle of the printer while repetitively outputting the actual speed and a speed that is different from the actual speed.

The control of the electric power supplied to the DC motor based on the speed detected by the encoder is performed by comparing the detected speed to a reference speed and performing ON control, wherein the electric power is provided to the DC motor, and OFF control, wherein the provision of electric power to the DC motor is stopped. At this time, the speed detected by the encoder in the first aspect includes the actual speed and a speed that is different from the actual speed, and thus the speed control is ON control and OFF control based on the actual speed, and ON control and OFF control based on a speed that is different from the actual speed. During the interval wherein the encoder outputs the actual speed, the DC motor is controlled based on the actual speed in the same manner as is conventional. On the other hand, the ON control and OFF control based on a speed that is different from the actual speed is performed intermittently during the single rotation of the encoder, and thus has the effect of chopper control.

Consequently, the first aspect achieves the three-level control of ON control, OFF control, and chopper control.

In the first aspect of the present invention, the structure of the encoder wherein there is non-uniform spacing of the pulse signal can have a variety of configurations.

A first configuration of the encoder is one wherein the non-uniform spacing region is broader than the uniform spacing in the uniform spacing region, so that when there is rotation at a constant speed the pulse signals that are outputted in this non-uniform spacing region will be fewer pulse signals than the pulse signals that are outputted in the uniform spacing region.

In this first configuration, the detected speed obtained from the pulse signals is detected as a speed that is lower than the actual speed, and so electric power will be provided even during the interval of the OFF control wherein the provision of electric power is stopped in the conventional DC motor, meaning that the power is supplied in the speed control over an interval that is longer than the a determined interval. As a result, even in a DC motor that has a small output torque, essentially control is performed so as to increase the output torque, suppressing the speed variations due to the load variations within a single cycle.

In a second configuration of the encoder, the non-uniform spacing region is narrower than the uniform spacing in the uniform spacing region, so that in rotation at a constant speed the pulse signals that are outputted from the non-uniform spacing region will be outputted in a larger number of pulse signals than the pulse signals that are outputted from the uniform spacing region.

In this second configuration, the detected speed obtained from the pulse signals is detected as a speed that is higher than the actual speed, so that an intermittent electric power will be supplied during an interval of ON control wherein electric power would be supplied in a conventional DC motor, so as to supply the electric power with greater responsiveness than simple ON control. Consequently, speed control is performed with excellent responsiveness even if the DC motor has a low output torque, thereby suppressing speed variations due to the load variations within a single cycle.

A third configuration of the encoder is a configuration that includes the first configuration and second configuration, described above, comprising a region portion wherein the non-uniform spacing region is wider than the uniform spacing of the uniform spacing region so that, under rotation at a constant speed, there will be fewer pulse signals outputted than the pulse signals that are outputted by the uniform spacing region, and a region portion that is narrower than the uniform spacing of the uniform spacing region so that, under rotation at a constant speed, the number of pulses that are outputted will be greater than the number of pulses that are outputted in the uniform spacing region.

In this third configuration, the detected speed, obtained from the pulse signals, is detected as lower than the actual speed, so that electric power is supplied even during the interval of OFF control wherein the electric power supply to a conventional DC motor would be stopped, and thus the supply of the electric power is performed in the speed control over a period of time that is longer than the period of time that is determined, and electric power is provided intermittently during the interval of ON control wherein electric power is provided to a conventional DC motor, to thereby supply electric power with greater responsiveness than simple ON control.

As a result, the speed variations due to load variations in a single cycle are suppressed, even in a DC motor with a small output torque.

The present invention is a motor speed control device for controlling a DC motor to a specific speed through feedback of the rotational speed of the DC motor, comprising an encoder for outputting pulse signals depending on the rotation of the motor, a speed detecting unit for calculating the speed of rotation of a motor from the pulse signals of the encoder, a speed comparing unit for comparing the speed detected by the speed detecting unit to a specific speed, and a control unit for controlling the driving of a DC motor, based on the output of the speed comparing unit, so that the rotational speed of the DC motor will match a specific speed, with the present invention including a speed controlling device for a DC motor provided with the encoder described above, and a printer provided with this DC motor speed controlling device.

This encoder, as described above, has a pulse forming region for forming pulse signals, where this pulse forming region is provided with a non-uniform spacing region in a portion of a uniform spacing region, on the periphery of the encoder plate.

A second aspect of the present invention relates to a structure for performing three-level control, through the addition of chopper control to ON control and OFF control through signal processing using a speed signal, and is an aspect wherein, along with switching between ON control and OFF control through a comparison between the speed signal and a reference signal, chopper control is performed between the ON control and OFF control when switching.

A printer of the second aspect has a DC motor, a paper feeding unit that includes a paper feeding roller that uses the DC motor as the driving source, and a printing mechanism unit, where printing is performed by the printing mechanism unit onto paper after a specific amount of feeding by the paper feeding unit, and comprises an encoder that outputs pulse signals according to the rotation of the DC motor, and a control unit that controls the driving of the motor based on a pulse signal from the encoder. Here the control unit calculates the rotational speed of the DC motor from the pulse signal from the encoder, and performs speed control using three control intervals: a first control interval wherein, in the DC motor rotational speed variation, the rotational speed of the DC motor is greater than a specific speed, so that the supply of the driving electric current to the DC motor is cut off; a second control interval wherein the rotational speed of the DC motor is less than a specific speed so that the driving electric current is supplied to the DC motor; and a third control interval, between the first control interval and the second control interval, wherein the speed of rotation of the DC motor is changing, with a specific speed as a threshold, where a chopper drive is performed to supply a driving electric current to the DC motor intermittently.

Moreover, the detection of the DC motor rotational speed can be in a configuration wherein the detection is performed based on an interval signal outputted by the printing mechanism unit, instead of a configuration wherein detection is performed based on the aforementioned encoder pulse signal. The control unit controls the driving of the motor based on an interval signal outputted by the printing mechanism unit.

The first control interval and the second control interval, described above, correspond, respectively, to the interval wherein OFF control is performed and the interval wherein ON control is performed, and the third control interval corresponds to the interval wherein chopper control is performed.

By performing three-level control that switches between ON control, OFF control, and chopper control based on signal processing using a speed signal in a printer of the second aspect, the electric power is supplied over a longer interval than the determined interval in speed control through providing electric power in also the interval of OFF control wherein the supply of electric power to the conventional DC motor would be stopped, and supplies electric power with greater responsiveness than simple ON control by supplying the electric powered intermittently in an interval of ON control wherein electric power would be supplied to a conventional DC motor, the same as in a printer of the first aspect of the present invention. As a result, the speed variation due to load variations with in a single operating cycle is suppressed, even for a DC motor with a small output torque.

Moreover, a second aspect of the present invention can be applied to a DC motor speed control device.

The present invention can suppress speed variation due to load variation within a single operating cycle in a DC motor and in a printer provided with a DC motor.

BRIEF DESCRIPTION OF THE DRAWINGS

FIGS. 5A to 5E are diagrams for explaining the speeds and control states during a single operating cycle of a printer according to present invention;

FIGS. 7A to 7E are diagrams for explaining the speeds and control states during a single operating cycle of a conventional printer;

FIGS. 17A and 17B are schematic diagrams for explaining a conventional printer.

EXPLANATION OF LETTERS AND NUMERALS

1. PRINTER
2. PRINTING MECHANISM

3. PRINTING UNIT
3A. TYPE ROLLER
3B. PRINT WHEEL
3C. WHEEL GEAR
3D. SELECTING PAWL
3E. SELECTING MECHANISM
3F. MAIN GEAR
4. PLATEN UNIT
4A. PLATEN ROLLER
4B. PLATEN GEAR
5. PAPER FEEDING UNIT
5A. PAPER FEEDING ROLLER
6. TRANSMISSION MECHANISM
6A. GEAR
6B. GEAR
7. DC MOTOR
8. POWER SUPPLY
9. CONTROL UNIT
9a. SPEED DETECTING UNIT
9b. SPEED COMPARING UNIT
9c. DRIVER CONTROL UNIT
9d. DRIVER
9e. CONTROL SIGNAL FORMING UNIT
10. ENCODER
10a. ENCODER PLATE
10b. MISSING SLIT PORTION
10c. ENCODER PLATE
10d. SUPPLEMENTAL PLATE
10e, 10f. GEARS
11. RIBBON FEEDING UNIT
11A. INK RIBBON
12. DETECTOR
12a. LIGHT-EMITTING UNIT
12b. LIGHT-SENSITIVE UNIT
13. INVERTER SIGNAL GENERATING UNIT
20. PRINTING PAPER
101. PRINTER
102. PRINTING MECHANISM
103. PRINTING UNIT
104. PLATEN UNIT
105. PAPER FEEDING UNIT
105A. PAPER FEEDING ROLLER
106. TRANSMISSION MECHANISM
107. DC MOTOR
108. POWER SUPPLY UNIT
109. CONTROL UNIT
110A. ENCODER PLATE
110B. SLIT
111. RIBBON FEEDING UNIT
113. INVERTER SIGNAL GENERATING UNIT
120. PRINTER PAPER

BEST MODE FOR CARRYING OUT THE INVENTION

The motor speed control device and printer using the same, according to the present invention, will be described in detail below using the drawings.

Figure 1:
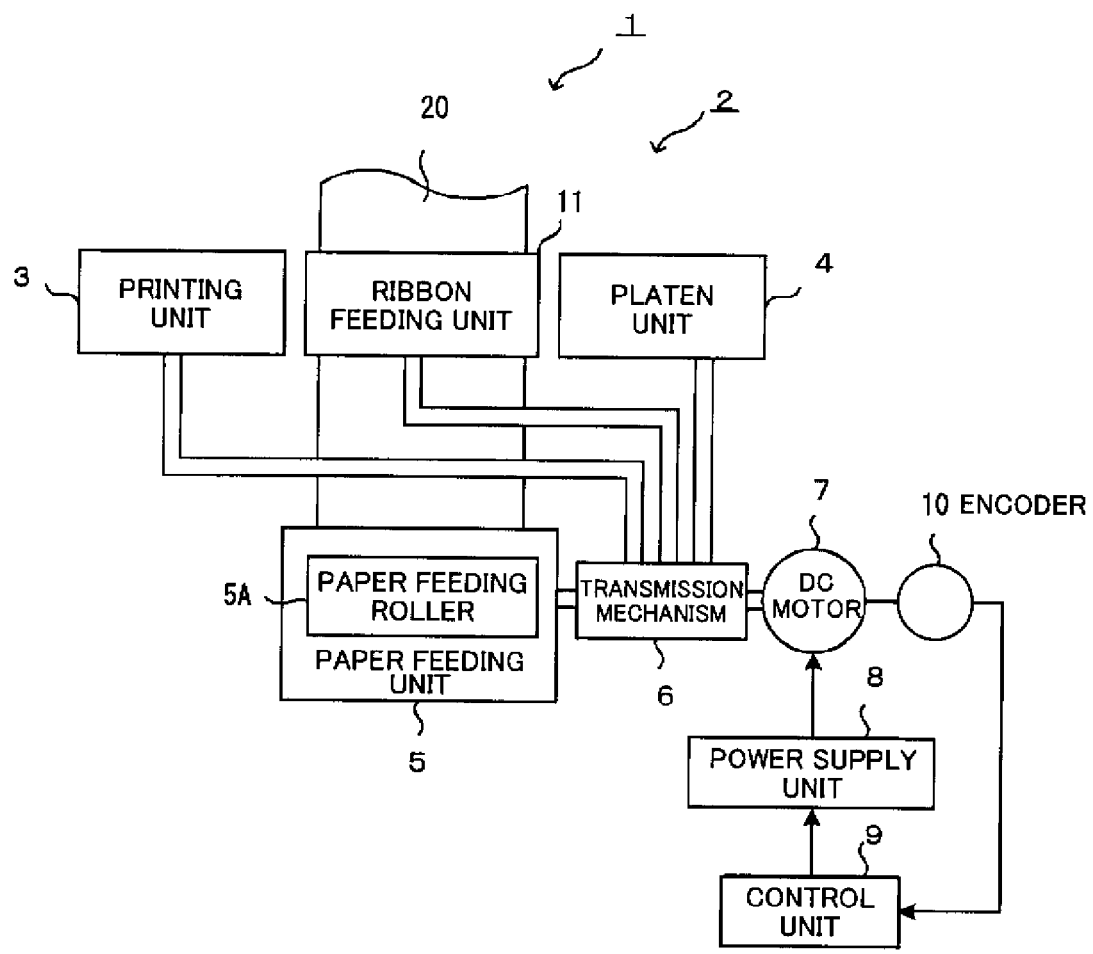
FIG. 1 is a diagram for explaining the schematic structure of a printer and DC motor speed control device according to the present invention.

FIG. 1 is a diagram for describing the schematic structure of the present invention. In FIG. 1, a printer 1 is provided with a printing mechanism unit 2 for performing the printing, and a paper feeding unit 5 for feeding printer paper 20. The printing mechanism unit 2 is provided with a printing unit 3 that has a type roller, and the like, a platen unit 4 that presses printer paper 20 against the type roller, with an ink ribbon (not shown) interposed therebetween, and a ribbon feeding unit 11 for feeding and ink ribbon between the printing units and the printer paper. The paper feeding unit 5 is provided with a paper feeding roller 5A, where this paper feeding roller 5A is driven rotationally by a DC motor 7 through a transmission mechanism 6 comprising gears, and the like. The printing unit 3, platen unit 4, and ribbon feeding unit 11 are also driven by the DC motor 7 through a transmission mechanism 6. The DC motor 7 receives a supply of electric power from a power supply unit 8.

An encoder 10 is attached to the DC motor 7, either directly or through a gear. The encoder 10 outputs pulse signals according to the rotation of the DC motor 7, and sends these pulse signals to the control unit 9. The control unit 9 detects the speed of the DC motor 7 based on the pulse signals obtained from the encoder 10, where the power supply unit 8 is controlled based on the speed that is detected, to thereby perform speed control on the DC motor 7.

In a first aspect, having the structure described above in the present invention, the encoder 10 outputs a pulse signal that forms the actual speed of the DC motor 7, and also outputs a pulse signal that forms a speed other than the actual speed, where these two types of pulse signals are used to perform three-level control with chopper control in addition to the two-level control of ON control and OFF control.

Additionally, in a second aspect, signal processing of the actual speed of the DC motor 7 is used to perform three-level control including chopper control in addition to the two-level control of ON control and OFF control.

Figure 2:
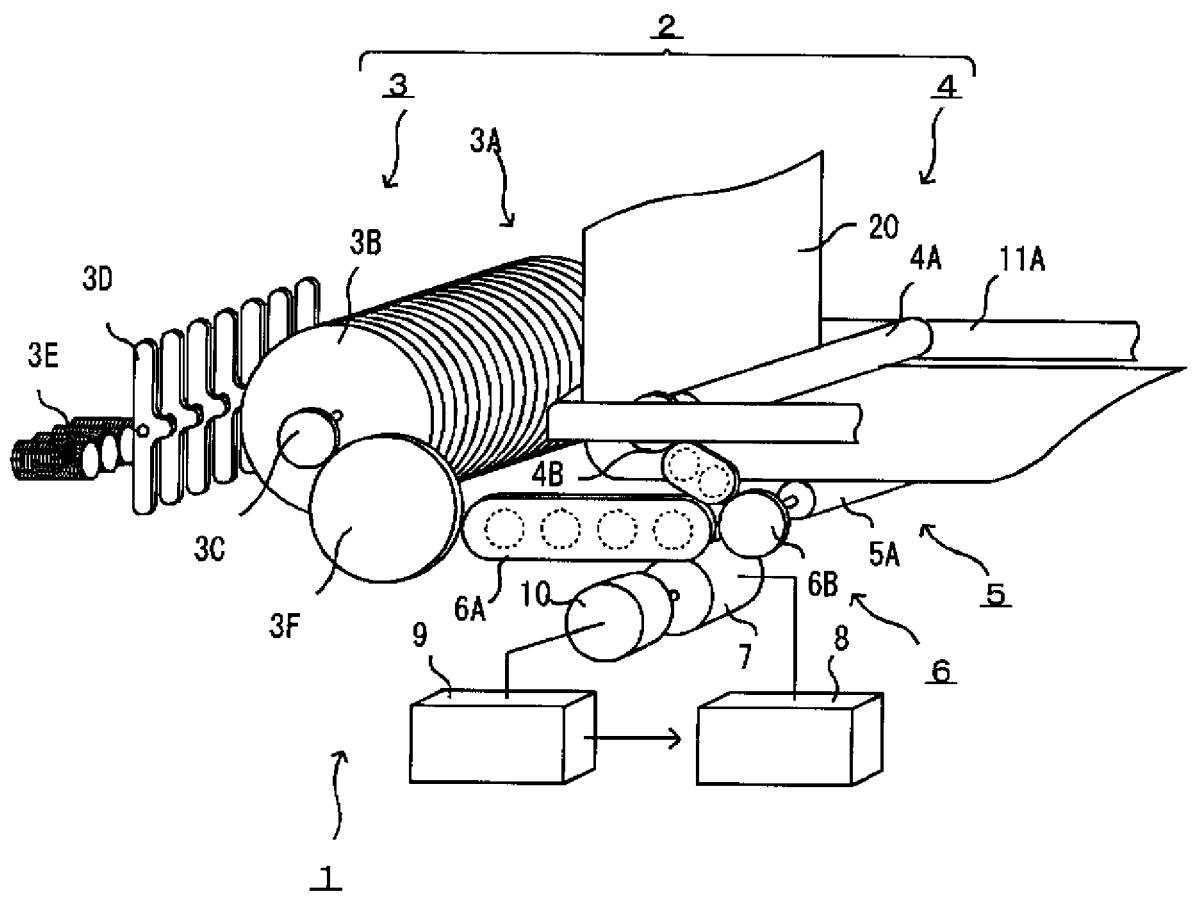
FIG. 2 is a diagram for explaining the schematic structure of a printer according to the present invention.

FIG. 2 is a diagram for describing the schematic structure of a printer as set forth in the present invention. In FIG. 2, the printer 1 is provided with a printing unit 3 that structures a printing mechanism unit 2, a platen unit 4, a ribbon feeding unit 11, and, additionally, a paper feeding unit 5, where the driving force of the DC motor 7 is transmitted through the transmission mechanism 6 to these various structural units through switching within a single operating cycle.

The printing unit 3 is provided with a type roller 3A wherein a plurality of print wheels 3B, having type disposed around the periphery thereof, is provided on a single shaft. The print wheels 3B are driven by a wheel gear 3C being rotated by a main gear 3F. The main gear 3F can be driven by the DC motor 7 through a gear 6A. In printing by the type roller 3A, operations for selecting the type to be printed are performed sequentially for the plurality of print wheels 3B while the print wheels 3B are being rotated, to thereby set one line of type, and the type roller 3A, on which the type has been set, is pressed by a platen roller 4A, with an ink ribbon 11A and the printer paper 20 interposed therebetween. The selection of the type for the print wheel 3B is performed by a selecting pawl 3D and a selecting mechanism 3E. Selecting pawls 3D are disposed corresponding with each of the print wheels 3B, where a pawl part is positioned away from the print wheels 3B when not selected, and when selecting, the type is selected by the pawl part contacting the print wheel 3B. The selecting mechanism 3E is a mechanism that swivels the selecting pawl 3D to perform the selecting operation, and when, during the selection of the print wheel 3B, the type to be selected is in the correct position, the selecting pawl 3D is swiveled to the print wheel 3B side to stop the rotation to select the type.

The platen unit 4 is provided with a platen roller 4A that presses the printer paper 20 and the ink ribbon 11A against the type roller 3A, and a guide portion for guiding the printer paper 20 to the platen roller 4A. In this platen roller 4A, a platen gear 4B is driven by the DC motor 7 through a gear mechanism.

The paper feeding unit 5 is provided with a paper feeding roller 5A, where the printer paper 20 is advanced by a specific amount at a time towards the platen carrier side through the rotation of the paper feeding roller 5A. The paper feeding roller 5A is rotationally driven by the DC motor 7 via the gear 6B.

An encoder 10 is provided on the DC motor 7 to output a pulse signal depending on the rotation of the DC motor. The control unit 9 inputs this pulse signal and calculates the rotational speed, to control the power supply unit 8 depending on the rotational speed, to thereby control of the rotational speed of the DC motor 7.

An embodiment wherein pulse signals are formed with non-uniform spacing by the encoder, and these pulse signals are used to control the speed of a DC motor provided in a printer, will be described using FIG. 3 through FIG. 13.

Figure 3:
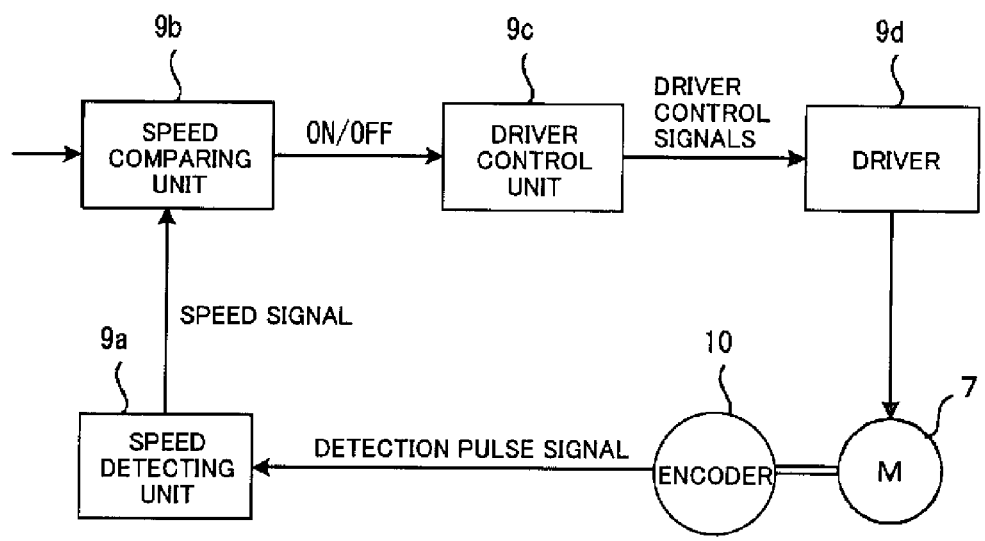
FIG. 3 is a diagram for explaining the structure of a control unit when using an encoder plate wherein the slit intervals are non-uniform.

FIG. 3 is a diagram for describing the structure of the control unit in a case wherein an encoder plate having non-uniform slit spacing is used. In FIG. 3, the control unit 9 is provided with a speed detecting unit 9a that inputs detection pulse signals from the encoder 10 to form a speed signal, a speed comparing unit 9b that compares a detected speed value, from the speed signal, to a reference speed value, a driver control unit 9c that forms a driver controlling signal for controlling a driver 9d based on an ON control signal or an OFF control signal sent from the speed comparing unit 9b, and a driver 9d that drives a power supply unit 8 (not shown in FIG. 3).

The speed comparing unit 9b forms an ON control signal for driving the DC motor 7 when the detected speed value is less than a reference speed value, and forms an OFF control signal for stopping the driving of the DC motor 7 when the detected speed value is greater than the reference speed value. The driver control unit 9c forms a driver control signal for controlling the driver 9d based on the ON control signal or the OFF control signal that are sent from the speed comparing unit 9b, and the power supply unit 8 is driven thereby to drive the DC motor 7.

An example of the use of an encoder with a non-uniform slit width for controlling the speed of a DC motor using pulsed signals with a non-uniform spacing, formed by the encoder according to the present invention, will be described below using FIG. 4 through FIG. 13. Note that while this description uses an example of an optical encoder wherein a plurality of slits is disposed on a single periphery of the encoder with a light-emitting element and a light-sensitive element disposed on either side of the slits so as to detected the light that passes through the slits, a reflective encoder may be used instead of the transmissive encoder, and there is no limitation to an optical encoder, but rather a variety of different encoders, such as a magnetic encoder wherein the detection is through magnetism, may be used instead.

The encoder in the present invention can form pulsed signals with non-uniform spacing through a structure wherein the slit spacing is non-uniform for a region of a portion of slits that have uniform spacing, provided on a periphery of the encoder plate.

As the slits with non-uniform spacing, a structure wherein the spacing in a region for a portion of the slits with uniform spacing is increased, a structure wherein the spacing in a region for a portion of the slits with uniform spacing is narrowed, or a structure wherein the spacing for a region for a portion of the slits with uniform spacing is increased and the spacing for a region of another portion is narrowed can be used.

The structure wherein the spacing for a region for a portion of the slits with uniform spacing is increased will be explained below using FIG. 4 through FIG. 9. A structure wherein the spacing for a region for a portion of the slits with uniform spacing is narrowed will be described below using FIG. 10 and FIG. 11. The structure provided with both a region wherein the spacing is increased and a region wherein the spacing is narrowed will be described using FIG. 12 and FIG. 13.

The structure wherein the spacing for a region for a portion of the slits that have uniform spacing is increased will be described first. This structure wherein the spacing of a region of a portion of the slits that have uniform spacing is increased is a structure that reduces the pulse signals that are detected by the encoder during one rotation of the encoder.

Figure 4A:
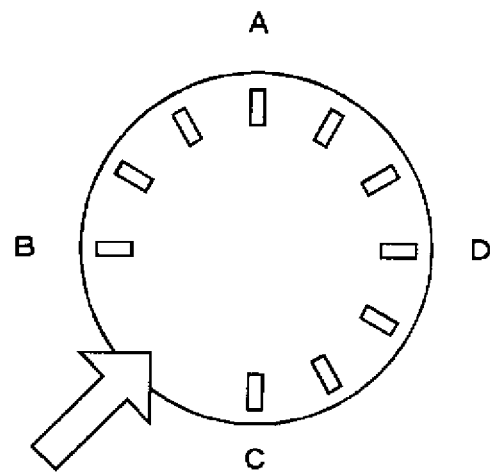
FIGS. 4A and 4B are diagrams for explaining an example of a structure of an encoder according to the present invention.

FIG. 4A shows schematically one example of this encoder. Note, for convenience of explanation, that the circle of the encoder is shown divided into A, B, C, and D. An example is shown of a structure wherein, of those slits disposed with uniform spacing on the same periphery, the slit disposed between B and C is omitted, to increase the slit spacing in this part. Note that it is possible to set freely the angular range of the region that has the non-uniform slit spacing. Moreover, the reduced number of slits is determined by the angle of the region and the angle between adjacent slits.

Figure 4B:
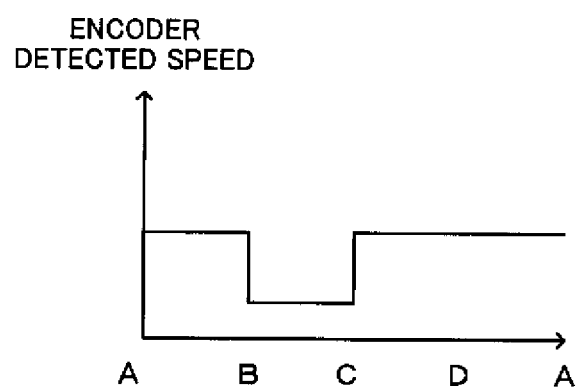

FIG. 4B shows schematically the detected speed that is detected based on the pulse signals that are detected when the encoder is rotated at a constant speed. The rotational speed that is detected in the region wherein the slit is missing (between B and C) is a lower speed than the detected speed that is detected by the slits that are disposed with uniform spacing. The encoder outputs the detected speed as shown in FIG. 4B during the interval of a single rotation.

FIG. 5 shows the actual speed of the DC motor (FIG. 5(a)), the detected speed that is detected by the encoder (FIG. 5B), the ON control signal (FIG. 5C) and the OFF control signal (FIG. 5D) that are formed based on the detected speed of the encoder, and the control states (FIG. 5E) caused by these control signals in a single operating cycle of the printer.

In the printer, the actual speed of the DC motor varies as shown in FIG. 5A due to the load variation that occurs during a single operating cycle. For example, when the load is increased, the actual speed of the DC motor decreases, and when the load is decreased, the actual speed of the DC motor increases. When the actual speed of the DC motor is detected using the encoder wherein the slits in one portion thereof have been all omitted, as shown in FIG. 4, there is a portion of the interval of one rotation of the encoder wherein there is a decrease in the detected speed. Of the detected speeds, detected by the encoder, shown in FIG. 5B, the part wherein the speed decreases in a pulse shape corresponds to this portion wherein the slit has been removed.

Consequently, in the detected speed of the encoder, shown in FIG. 5B, the part wherein the speed decreases in a pulse shaped, corresponding to the part wherein the slit has been omitted, serves as a signal that is superimposed according to the period of rotation of the encoder, onto the actual speed (the long cycle portion) of the DC motor. In FIG. 5B, the interval indicated by A-A corresponds to the interval over which the encoder rotates once (for example, the interval of A-A).

In the DC motor speed control, the detected speed of the encoder is compared to a reference speed (vo in FIG. 5B), and if the detected speed is lower than the reference speed, then an ON control signal is formed to supply electric power to the DC motor (FIG. 5C), and when the detected speed is higher than the reference speed, then the supply of electric power to the DC motor is stopped (FIG. 5D).

At this time, when the detected speed (FIG. 5B) that is obtained from the encoder in the present invention is compared to the reference speed to form an ON control signal or an OFF control signal, there will be, along with the interval wherein the detected speed is lower than the reference speed and the interval wherein the detected speed is higher than the reference speed, an interval wherein the pulse-shaped periodic low-speed parts that are included in the detected speed cause the pulse-shaped low-speed portions to fall below the reference speed, to produce an interval wherein the ON control signal and the OFF control signal are generated periodically. This interval wherein the ON and OFF are repeated periodically is E1, E2, and E3 in FIG. 5C, for example, and F1, F2, and F3 in FIG. 5D.

In FIG. 5E, the interval over which the ON control signal is outputted corresponds to the ON interval wherein ON control is performed, and the interval over which the OFF control signal is outputted corresponds to the OFF interval over which OFF control is performed, where the interval over which the ON control signal and OFF control signal are generated periodically corresponds to the chopper interval.

As a result, instead of the two-level control of ON control and OFF control, the use of the encoder of the present invention enables three-level control, including chopper control.

A comparison of this three-level control that includes ON control, OFF control, and chopper control, to the conventional two-level control of ON control and OFF control will be explained using FIG. 6 and FIG. 7.

Figure 6A:
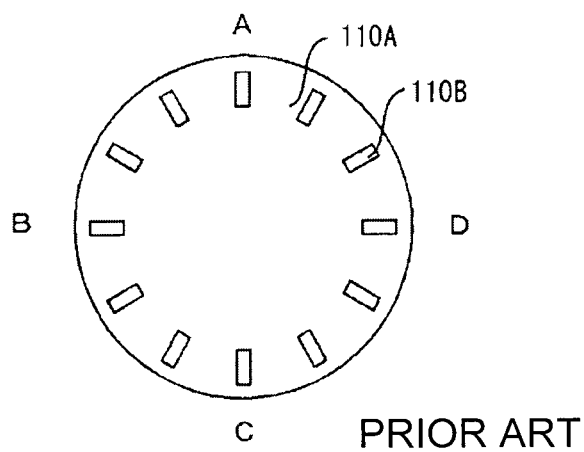
FIGS. 6A and 6B are diagrams for explaining an example of a structure of a conventional encoder.

FIG. 6A shows schematically one example of a conventional encoder. Note that, for convenience of explanation, the circle of the encoder is shown divided into A, B, C, and D here as well. This encoder has slits 110B disposed at equal intervals on the periphery of an encoder plate 110A.

Figure 6B:
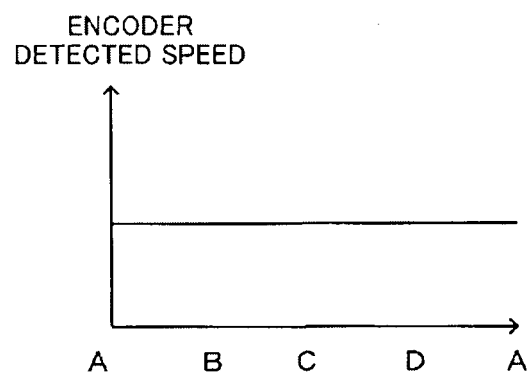
Figure 8A:
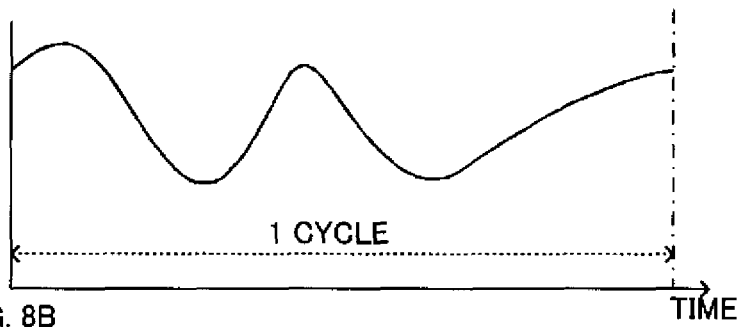
FIGS. 8A to 8D are diagrams for explaining the control states using an encoder plate having non-uniform spacing wherein the slit spacing has been increased according to the present invention.
Figure 8B:
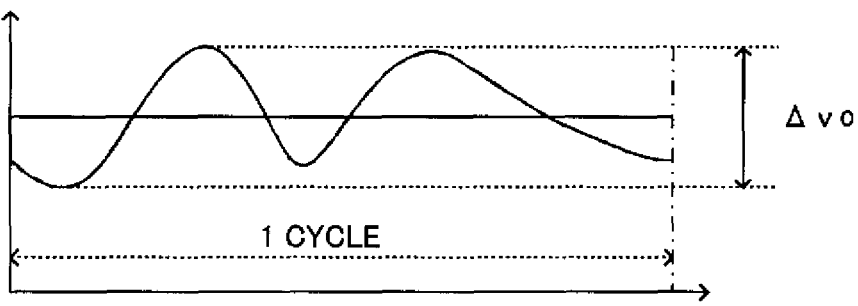
Figure 8C:
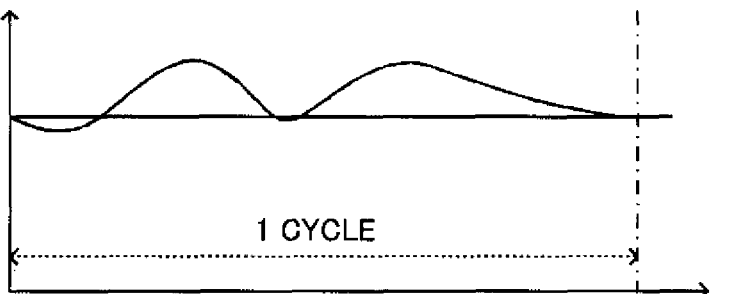
Figure 8D:
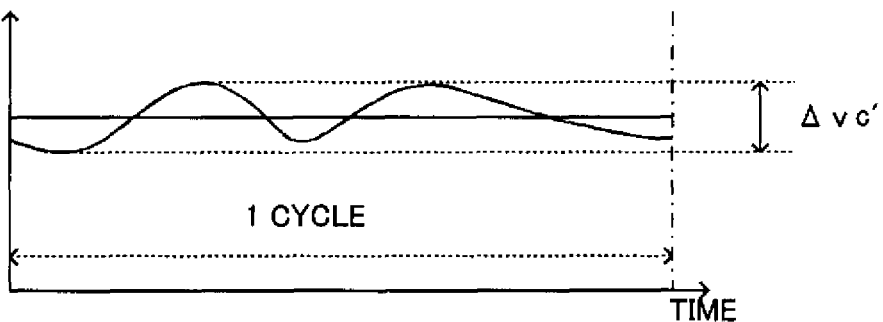

FIG. 6B illustrates schematically the detected speeds detected based on the pulsed signals that are detected when the encoder is rotated at a constant speed. Because in this encoder the slits are disposed at equal intervals, if the encoder is rotated at a constant speed, the detected speed is outputted as a constant speed.

FIG. 7 shows the actual speed of the DC motor (FIG. 7A), the detected speed that is detected by the encoder (FIG. 7B), the ON control signal (FIG. 7C) and the OFF control signal (FIG. 7D) that are formed based on the detected speed of the encoder, and the control states (FIG. 7E) caused by these control signals in a single operating cycle of the printer.

When there is a variation in the actual speed of the DC motor, as shown in FIG. 7A, due to the load variation in a single operating cycle of the printer, the actual speed of the DC motor varies according to this load variation. When the actual speed of the DC motor is detected by the encoder that is provided with slits at equal intervals as shown in FIG. 6, the encoder outputs detected speeds that indicate speed variations that are the same as those of the actual speeds of the DC motor, as shown in FIG. 7B.

In the DC motor speed control, the detected speed of the encoder is compared to a reference speed (vo in FIG. 7B), and if the detected speed is lower than the reference speed, then an ON control signal is formed to supply electric power to the DC motor (FIG. 7C), and when the detected speed is higher than the reference speed, then the supply of electric power to the DC motor is stopped (FIG. 7D).

In FIG. 7E, the interval over which the ON control signal is outputted corresponds to the ON interval wherein ON control is performed, and the interval over which the OFF control signal is outputted corresponds to the OFF interval over which OFF control is performed.

When FIG. 5C and FIG. 5D are compared to FIG. 7C and FIG. 7D, an interval wherein chopper control is performed occurs when the encoder plate that has the non-uniform spacing, wherein the slit spacing is increased according to the present invention, is used, and in particular, with the configuration wherein a slit is omitted, chopper control is performed for a portion of the interval that would be OFF control in conventional two-level control, thereby effectively suppressing speed variation even when using a DC motor with a small output torque.

FIG. 8 is a diagram for explaining the control states due to the encoder plate having non-uniform spacing, wherein the slit spacing has been increased according to the present invention. FIG. 8A shows the load variation. FIG. 8B shows the speed variation of the actual speed of the DC motor caused by the load variation. FIG. 8C shows the detected speed that is detected using the encoder plate having the non-uniform spacing wherein the slit spacing has been increased. FIG. 8D shows the actual speed of the DC motor that is obtained by the speed control based on the detected speed. Note that the state of variation of the load and speed in FIG. 8 is shown schematically for the interval of a single operating cycle of the printer, rather than showing the actual state of variation.

Figure 18A:
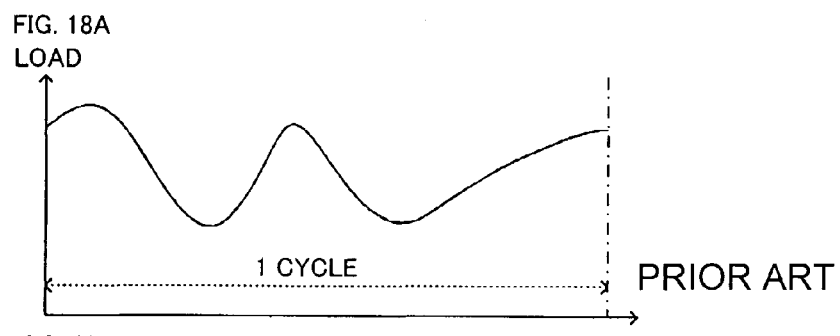
FIGS. 18A to 18D are diagrams for explaining the loads and speeds in conventional speed control.
Figure 18B:
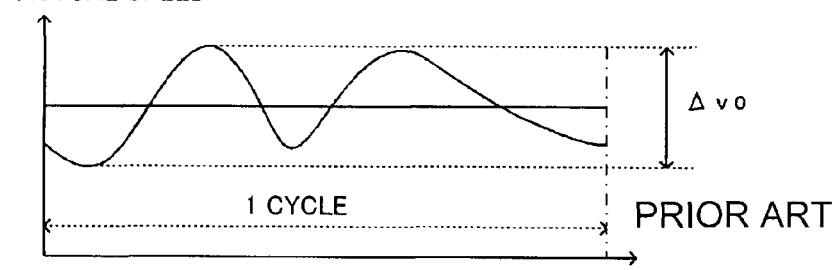
Figure 18C:
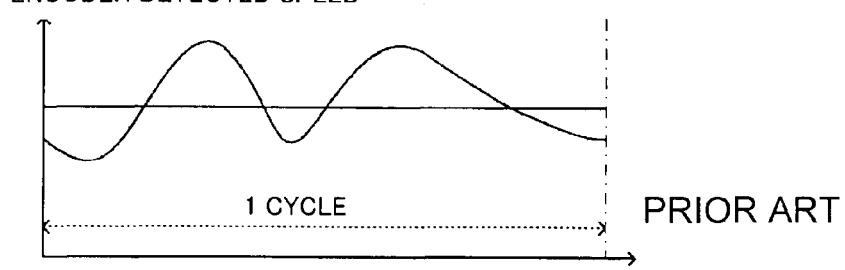
Figure 18D:
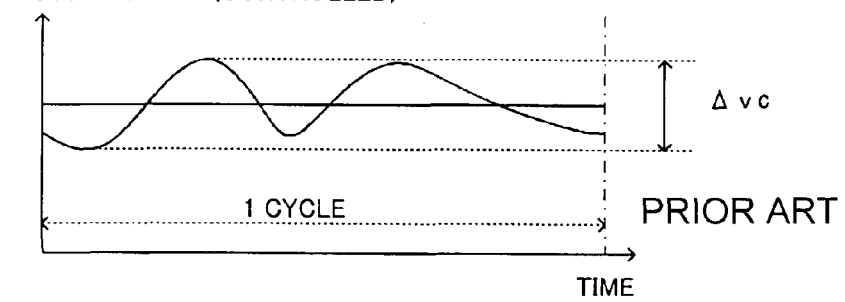

When the state of variation in the present invention, shown in FIG. 8, is compared to the state of variation in conventional control, shown in FIG. 18, are compared, control is performed towards the high-speed side by performing speed control based on the detected speed that is detected using the encoder plate that has non-uniform spacing wherein the slit spacing is elongated in the present invention, and thus the amplitude of speed of variation $\Delta vc'$ is suppressed more than the amplitude of speed variation $\Delta vc$ conventionally (FIG. 18D).

Figure 9A:
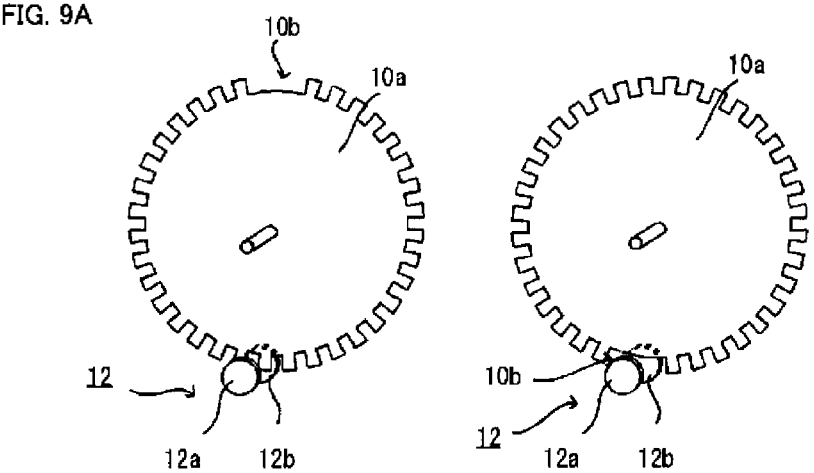
FIGS. 9A to 9C are schematic diagrams for explaining another example of a structure for detecting pulse signals with non-uniform spacing in an encoder according to the present invention.

FIG. 9 is a schematic diagram for explaining another example of a structure for detecting pulse signals with non-uniform spacing in an encoder. In this structural example, the non-uniform spacing region wherein the spacing of the slits is elongated is formed in a portion of a region wherein the slits were formed with uniform spacing on the same periphery of the encoder plate, as a structure for detecting pulsed signals with non-uniform spacing. FIG. 9A shows this structural example, where an encoder plate 10a is provided, and a missing slit portion 10b is formed in a portion of the slits that are provided with equal spacing, where this portion is the non-uniform spacing region. In a detector 12, a light-emitting unit 12a and a light-sensitive unit 12b are provided with the encoder plate 10a interposed therebetween, where the light-sensitive unit 12b detects that portion of the light generated by the light-emitting unit 12a that passes through the slits.

Figure 9B:
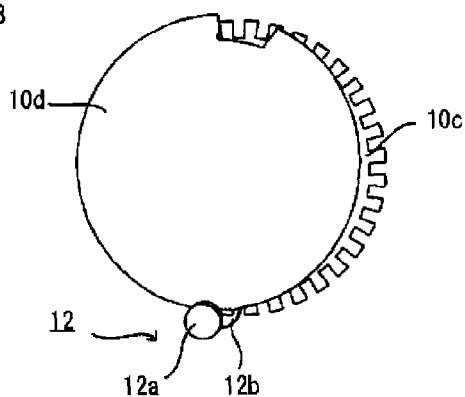

The structure for detecting the pulse signals with non-uniform spacing is not limited to the structure described above. FIG. 9B is a structure that combines the encoder plate 10c wherein slits are formed with uniform spacing, with a supplemental plate 10d for forming a non-uniform spacing region. The light-emitting unit 12a and the light-sensitive unit 12b are provided with the two plates, the encoder plate 10c and the supplemental plate 10d, interposed therebetween, where the light-sensitive unit 12b detects that portion of the light that is emitted from the light-emitting unit 12a that passes through both the encoder plate 10c and the supplemental plate 10d. The supplemental plate 10d forms a non-uniform spacing region by covering a portion of the slits that are formed on the periphery of the encoder plate 10c.

Figure 9C:
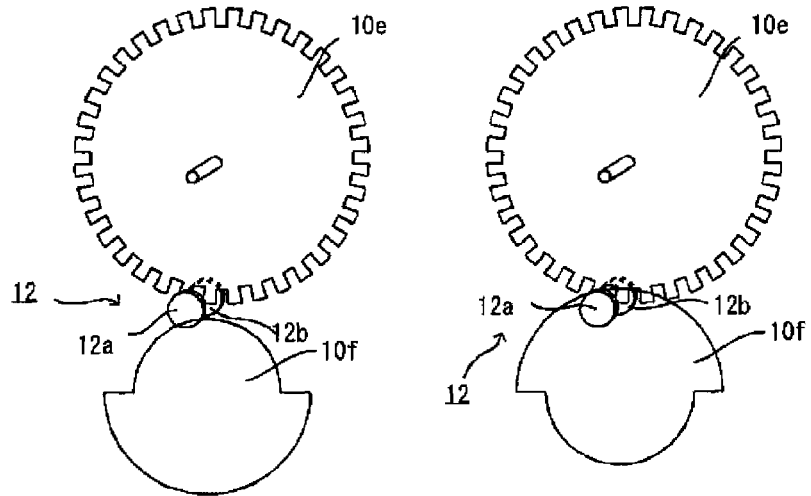

Moreover, the encoder plate may be structured using a portion of a gear provided in the printer. For example, the encoder 10c in FIG. 9B uses a gear provided in the printer, where the teeth of the gear may be used as the slits. Moreover, as shown in FIG. 9C, the gears 10e and 10f may be combined. When there is a gear 10f that overlaps the vicinity of the gear 10e during a portion of the rotation, the detector 12 is disposed at this overlapping portion, so that the light-sensitive unit 12b detects that portion of the light emitted by the light-emitting unit 12a that passes through both of the gears 10e and 10f.

Next FIG. 10 in FIG. 11 will be used to explain a structure wherein the spacing in a region of one portion of the equally spaced slits is narrowed. The structure wherein the spacing of a region in a portion of the equally spaced slits is narrowed is a structure wherein the pulse signals detected by the encoder are increased in one revolution of the encoder.

Figure 10A:
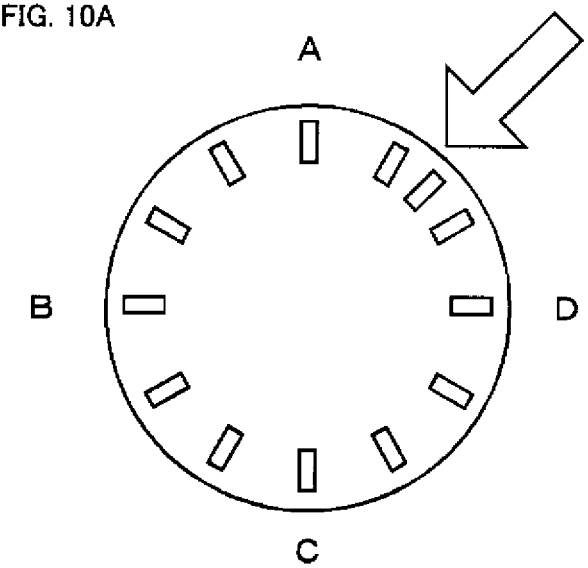
FIGS. 10A and 10B are diagrams for explaining another example of a structure of an encoder according to the present invention.

FIG. 10A shows schematically an example of this encoder. Note that, for convenience in explanation, one cycle of the encoder is divided into A, B, C, and D, in the same manner as in FIG. 4, above. This shows a structural example wherein the slit spacing has been narrowed in one portion by increasing the number of slits provided between D and A, of the slits that have been provided with equal spacing on the same periphery in the encoder. Note that the angular range of the region wherein the slits have non-uniform spacing can be set as desired. Moreover, the increased number of slits is determined by the angle of the region and the angle between adjacent slits.

Figure 10B:
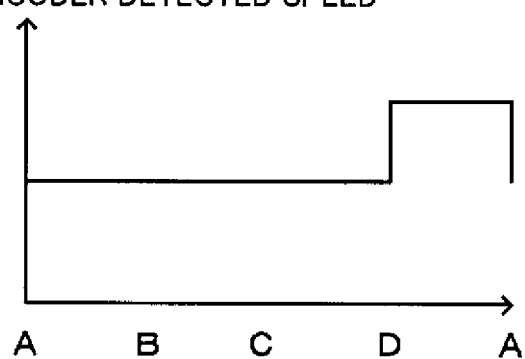

FIG. 10B shows schematically the detected speed that is detected based on the pulsed signals that are detected when the encoder is rotated with a constant speed. The detected speed that is detected in the region wherein the number of slits is increased (between D and A) is a speed that is higher than the detected speed that is detected by the slits that are disposed with equal spacing. The encoder outputs the detected speeds as shown in FIG. 10B during the interval of one rotation.

FIG. 11 shows the actual speed of the DC motor (FIG. 11A), the detected speed that is detected by the encoder (FIG. 11B), the ON control signal (FIG. 11C) and the OFF control signal (FIG. 11D) that are formed based on the detected speed of the encoder, and the control states (FIG. 11E) caused by these control signals in a single operating cycle of the printer.

Figure 11A:
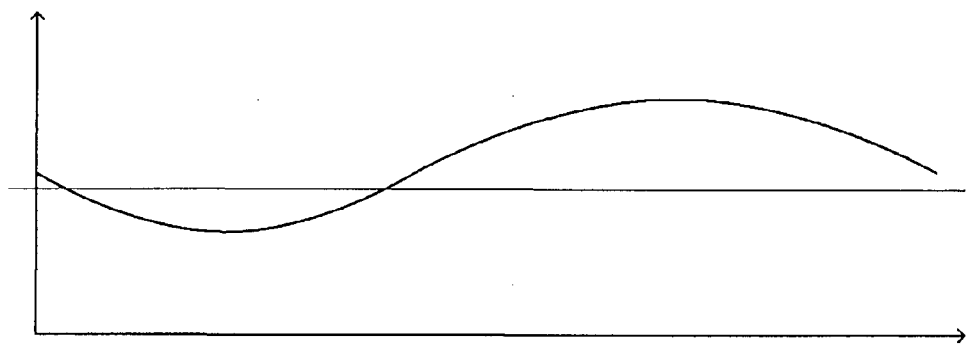
FIGS. 11A to 11E are diagrams for explaining the speeds and control states during a single operating cycle of a printer provided with an encoder of another structure according to the present invention.

In the same manner as shown in FIG. 4A, the actual speed of the DC motor varies, as shown in FIG. 11A depending on the load variation that occurs during a single operating cycle. For example, the actual speed of the DC motor decreases when the load increases, and the actual speed of the DC motor increases when the load decreases. When the actual speed of the DC motor is detected by the encoder where the number of slits in a portion thereof is increased, as shown in FIG. 10, a portion where the detected speed is increased is produced during one rotation of the encoder. Of the detected speeds in the encoder as shown in FIG. 11B, the part wherein the speed is increased in a pulsed shape corresponds to the portion wherein the number of slits is increased.

Figure 11B:
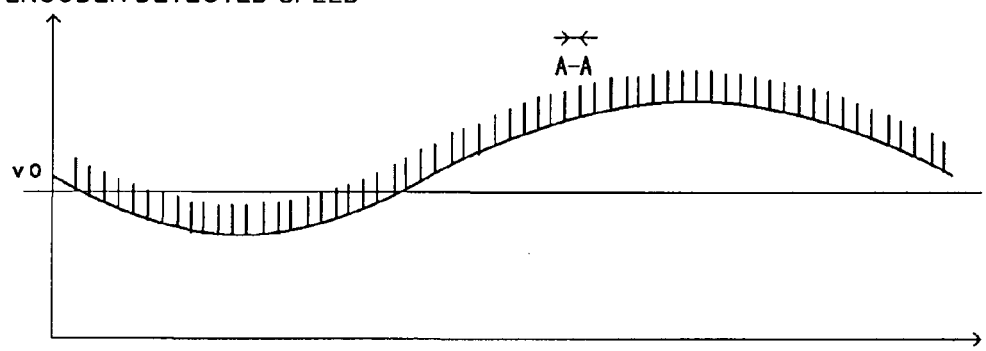
Figure 11C:
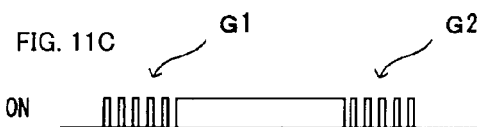

Consequently, the detected speed of the encoder shown in FIG. 11B is a signal wherein the pulse-shaped high-speed portions, corresponding to the portions wherein the number of slits has been increased, are superimposed according to the period of rotation of the encoder onto the actual speed of the DC motor (the long cycle portion).

In FIG. 11B the interval indicated by A-A corresponds to the interval wherein the encoder rotates once (for example, the interval of A-A).

Figure 11D:
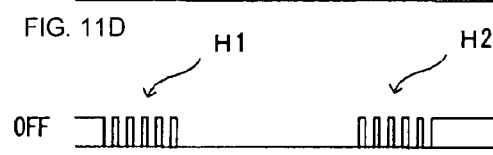

In the DC motor speed control, the detected speed of the encoder is compared to a reference speed (vo in FIG. 11B), and if the detected speed is lower than the reference speed, then an ON control signal is formed to supply electric power to the DC motor (FIG. 11C), and when the detected speed is higher than the reference speed, then the supply of electric power to the DC motor is stopped (FIG. 11D).

At this time, when the detected speed (FIG. 11B) that is obtained from the encoder in the present invention is compared to the reference speed to form an ON control signal or an OFF control signal, there will be, along with the interval wherein the detected speed is lower than the reference speed and the interval wherein the detected speed is higher than the reference speed, an interval wherein the pulse-shaped periodic high-speed parts that are included in the detected speed cause the pulse-shaped high-speed portions to be above the reference speed, to produce an interval wherein the ON control signal and the OFF control signal are generated periodically. This interval wherein the ON and OFF are repeated periodically is G1, and G2 in FIG. 11C, for example, and H1 and H2 in FIG. 11D.

Figure 11E:
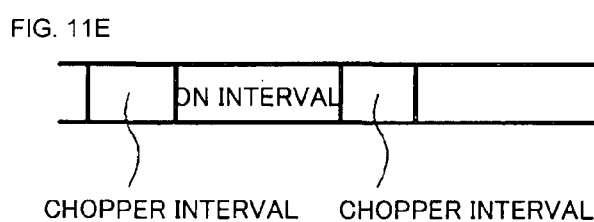

In FIG. 11E, the interval over which the ON control signal is outputted corresponds to the ON interval wherein ON control is performed, and the interval over which the OFF control signal is outputted corresponds to the OFF interval over which OFF control is performed, where the interval over which the ON control signal and OFF control signal are generated periodically corresponds to the chopper interval.

As a result, instead of the two-level control of ON control and OFF control, the use of the encoder of the present invention enables three-level control, including chopper control.

FIG. 12 and FIG. 13 will be used next to explain a structure provided with both an interval wherein the spacing is increased and an interval wherein the spacing is narrowed in portions of the equally spaced slits. The structure wherein the spacing in a region of a portion of the equally spaced slits is elongated is a structure provided with both a portion wherein, within a single rotation of the encoder, the number of pulsed signals detected by the encoder is decreased and a portion wherein the number of pulsed signals detected by the encoder is increased.

Figure 12A:
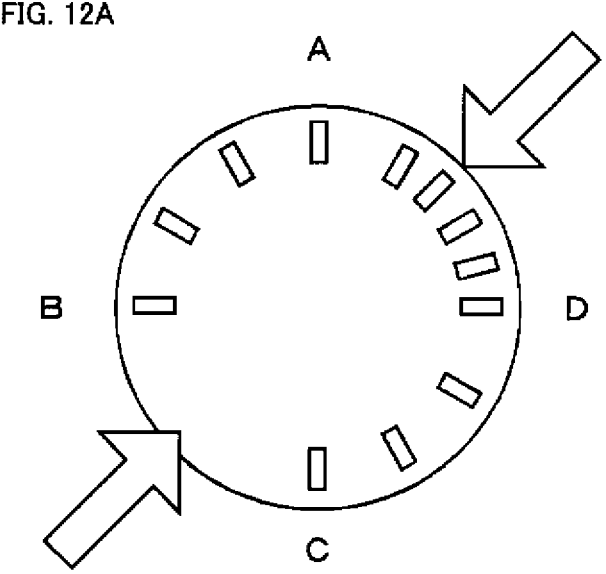
FIGS. 12A to 12B are diagrams for explaining another example of a structure of an encoder according to present invention.

FIG. 12A shows schematically an example of this encoder. Note that, for convenience of explanation, one cycle of the encoder is shown divided into the A, B, C, and D, in the same manner as in the aforementioned FIG. 4 and FIG. 10. This encoder shows a structural example wherein, of the slits that are disposed with equal spacing around the periphery, the slit that is disposed between B and C has been removed in order to increase the slit spacing in this portion, and the number of slits disposed between D and A has been increased to narrow the slit spacing in this portion. Note that the angular range of the region with non-uniforms slit spacing can be set at will. The number of slits that are increased is determined by the angle of this region and by the angle between adjacent slits.

Figure 12B:
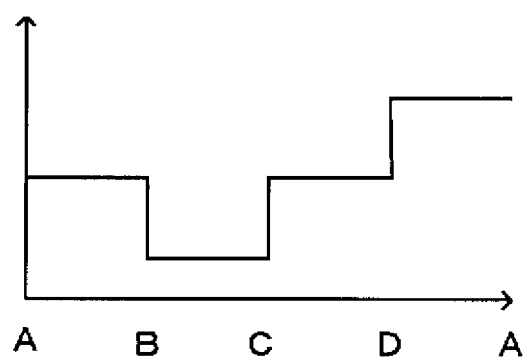

FIG. 12B shows schematically the detected speed that is detected based on the pulsed signals that are detected when the encoder is rotated with a constant speed. The detected speed that is detected in the region wherein the number of slits is decreased (between B and C) is a speed that is lower than the detected speed that is detected by the slits that are disposed with uniform spacing, and the detected speed that is detected in the region with an increased number of slits (between D and A) is a speed that is higher than the detected speed that is detected by the slits that are disposed with uniform spacing. During a single rotation, the encoder outputs detected speeds such as shown in FIG. 12B.

FIG. 13 shows the actual speed of the DC motor (FIG. 13A), the detected speed that is detected by the encoder (FIG. 13B), the ON control signal (FIG. 13C) and the OFF control signal (FIG. 13D) that are formed based on the detected speed of the encoder, and the control states (FIG. 13E) caused by these control signals in a single operating cycle of the printer.

Figure 13A:
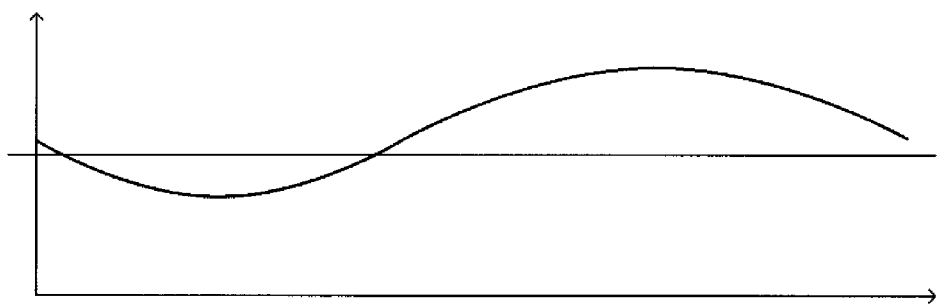
FIGS. 13A to 13E explain the speeds and control states during a single operating cycle of a printer provided with an encoder of another structure according to the present invention.

In the same manner as shown in FIG. 4A and FIG. 11A, the actual speed of the DC motor varies, as shown in FIG. 13A depending on the load variation that occurs during a single operating cycle. For example, the actual speed of the DC motor decreases when the load increases and the actual speed of the DC motor increases when the load decreases. When the actual speed of the DC motor is detected by the encoder where the number of slits in a portion thereof is increased or decreased, as shown in FIG. 12, portions where the detected speed is increased or the detected speed is decreased are produced during one rotation of the encoder. Of the detected speeds in the encoder as shown in FIG. 13B, the part wherein the speed is decreased in a pulsed shape corresponds to the portion wherein the number of slits is decreased, and the part wherein the speed is increased in a pulsed shape corresponds to the portion wherein the number of slits is increased.

Figure 13B:
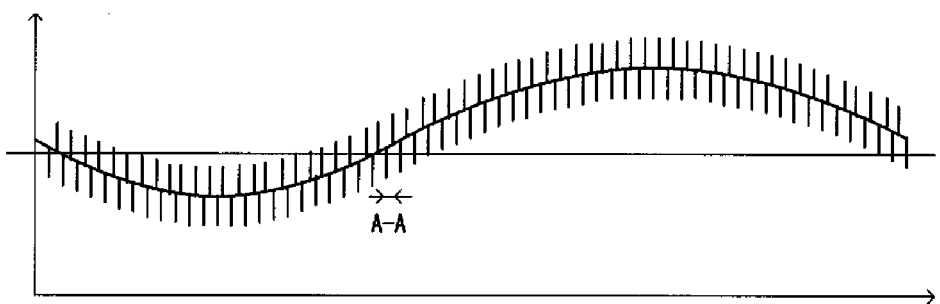
Figure 13C:
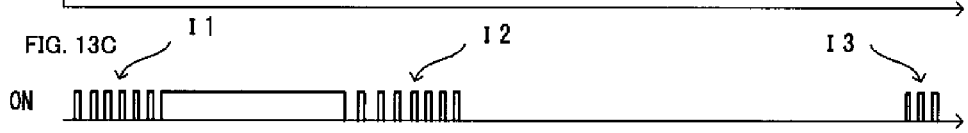

Consequently, the detected speed of the encoder shown in FIG. 13B is a signal wherein the pulse-shaped low-speed portions, corresponding to the portions wherein the number of slits has been decreased, and the pulse-shaped high-speed portions, corresponding to the portions wherein the number of slits has been increased, are superimposed according to the period of rotation of the encoder onto the actual speed of the DC motor (the long cycle portion).

In FIG. 13B the interval indicated by A-A corresponds to the interval wherein the encoder rotates once (for example, the interval of A-A).

Figure 13D:
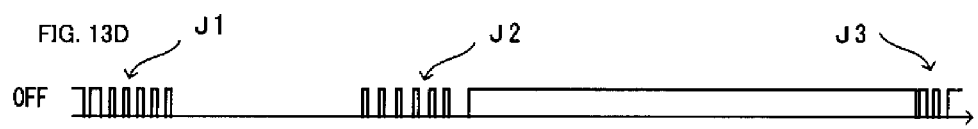

In the DC motor speed control, the detected speed of the encoder is compared to a reference speed (vo in FIG. 13B), and if the detected speed is lower than the reference speed, then an ON control signal is formed to supply electric power to the DC motor (FIG. 13C), and when the detected speed is higher than the reference speed, then the supply of electric power to the DC motor is stopped (FIG. 13D).

At this time, when the detected speed (FIG. 13B) that is obtained from the encoder in the present invention is compared to the reference speed to form an ON control signal or an OFF control signal, there will be, along with the interval wherein the detected speed is lower than the reference speed and the interval wherein the detected speed is higher than the reference speed, an interval wherein the pulse-shaped periodic low-speed parts that are included in the detected speed cause the pulse-shaped low-speed portions to be below the reference speed, and an interval wherein the pulse-shaped periodic high-speed parts that are included in the detected speed cause the pulse-shaped high-speed portions to be above the reference speed, to produce intervals wherein the ON control signal and the OFF control signal are generated periodically. These intervals wherein the ON and OFF are repeated periodically is I1, I2, and I3 in FIG. 13C, for example, and J1 and J2 in FIG. 13D.

Figure 13E:
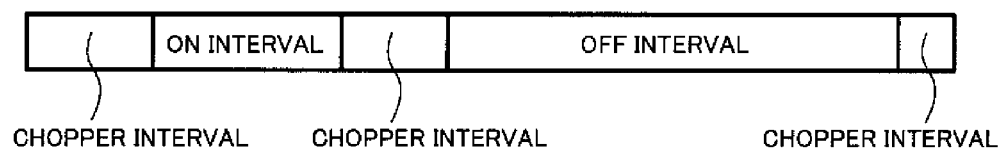

In FIG. 13E, the interval over which the ON control signal is outputted corresponds to the ON interval wherein ON control is performed, and the interval over which the OFF control signal is outputted corresponds to the OFF interval over which OFF control is performed, where the interval over which the ON control signal and OFF control signal are generated periodically corresponds to the chopper interval.

As a result, instead of the two-level control of ON control and OFF control, the use of the encoder of the present invention enables three-level control, including chopper control.

Given this embodiment, the interval over which chopper control is performed is extended relative to the structures provided with either a region wherein the spacing of the slits in the encoder is increased or a region wherein the spacing of the slits in the encoder is decreased, which can be expected to achieve smoother speed control.

The examples described above illustrate structures wherein detected speeds that are different from the actual speeds of the DC motor are obtained through the provision, in the encoder plate, of regions wherein the slit spacing is non-uniform. In addition to the use of an encoder plate having a region wherein the slit spacing is non-uniform, as described above as means for obtaining detected speeds that differ from the actual speeds of the DC motor there is also the use of an encoder plate having uniform slit spacing, where signal processing is performed on the detected signals, detected by an encoder having this encoder plate, to perform three-level control instead of two-level control through the addition of chopper control to ON control and OFF control.

Figure 14:
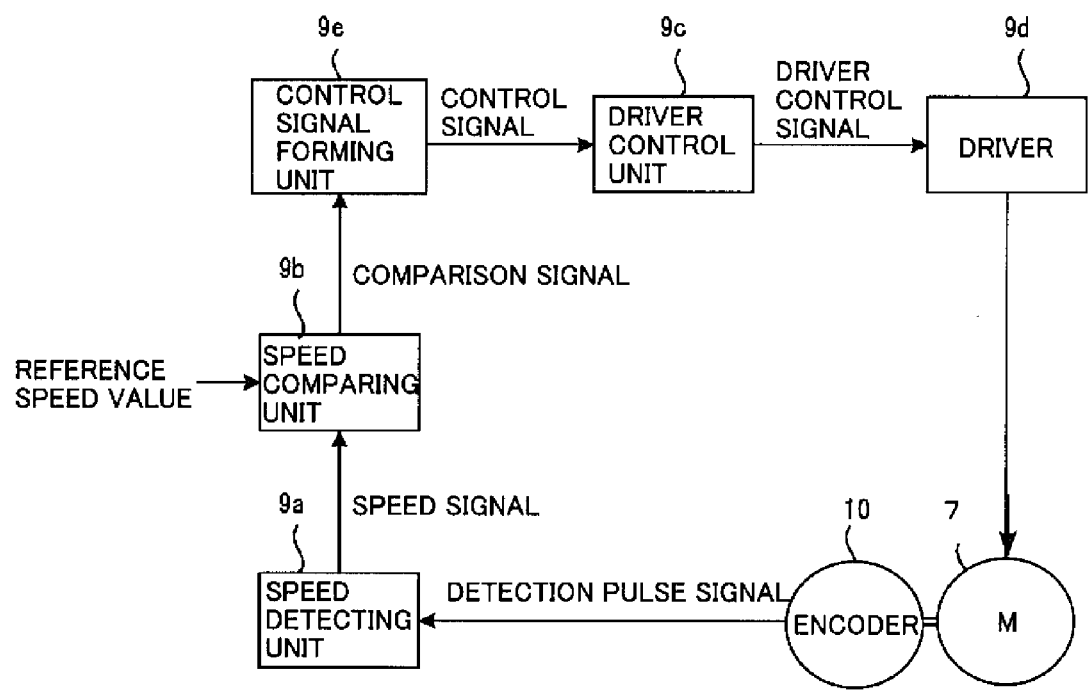
FIG. 14 is a diagram for explaining the structure of a control unit when using an encoder plate wherein the slit spacing is uniform.

FIG. 14 is a diagram for explaining the structure of a control unit in the case wherein an encoder plate having equal slit spacing is used. In FIG. 14, the control unit 9 comprises a speed detecting unit 9*a* that inputs detection pulse signals from the encoder 10 to form speed signals, a speed comparing unit 9*b* for comparing the detected speed value from the speed signal to a reference speed value, a control signal forming unit 9*e* for forming an ON control signal or an OFF control signal based on an intersection detection signal sent from the speed comparing unit 9*b*, a driver control unit 9*c* for forming a driver control signal for controlling a control driver 9*d* based on the control signal of the control signal forming unit 9*e*, and a driver 9*d* for supplying, to the motor, electric power from a power supply unit (not shown in FIG. 14) based on the driver control signal.

Because the slits provided in the encoder plate are equally spaced in the encoder 10, when the speed signal is detected using the detection pulse signals that are outputted from the encoder 10, the speed signals indicate the actual speed of the DC motor 7.

The speed comparing unit 9*b* compares the speed signal to a reference speed value and outputs a comparison signal. When the control signal forming unit 9*e* receives this comparison signal, if, after performing chopper control over a specific time interval from that point in time, the detected speed value is less than the reference speed value, then an ON control signal for driving the DC motor 7 is formed, but if the detected speed value is greater than the reference speed value, then an OFF control signal for stopping the driving of the DC motor 7 is formed. The driver control unit 9*c* forms a driver control signal for controlling the driver 9*d* based on the ON control signal or OFF control signal that is sent from the speed comparing unit 9*b*, and the power supply unit 8 (not shown in FIG. 14) is driven thereby to drive the DC motor 7.

Figure 15:
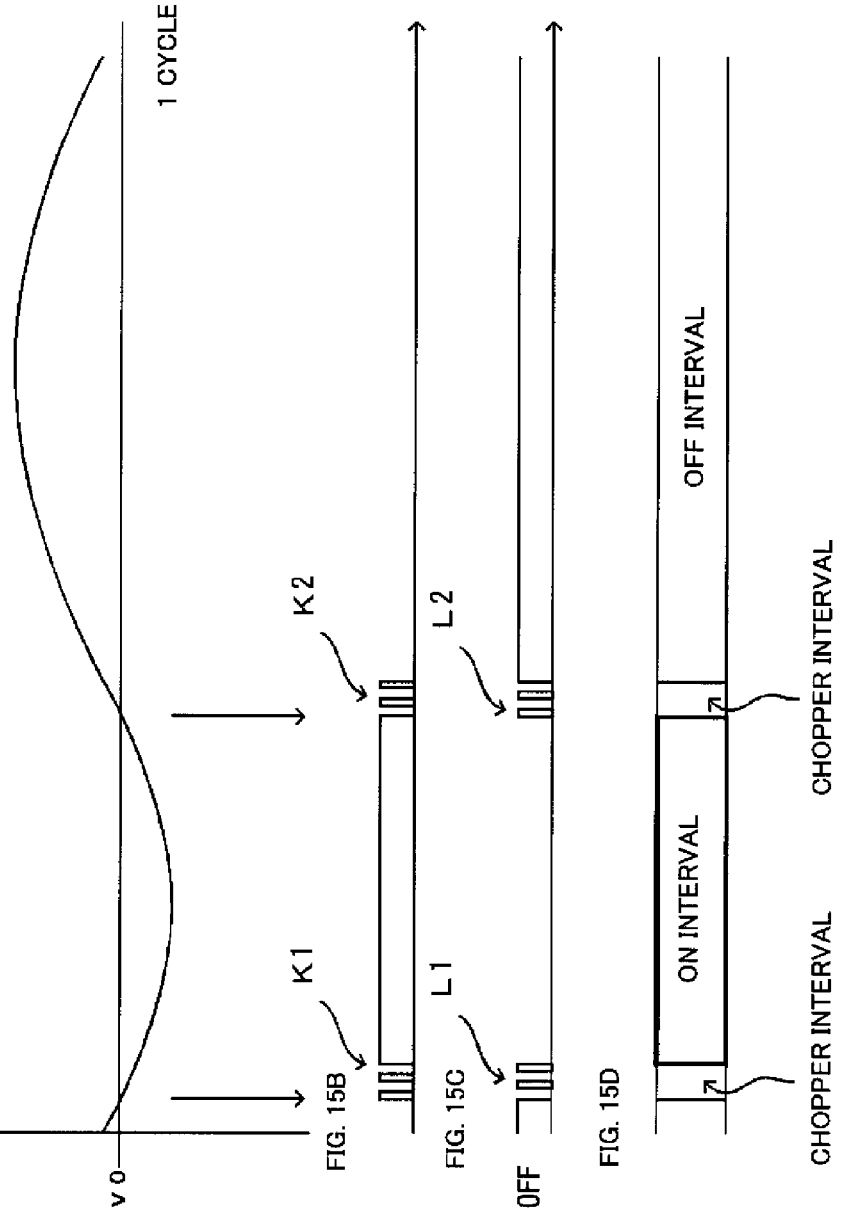
FIGS. 15A to 15D are diagrams for explaining the speeds and control states during a single operating cycle of a printer according to present invention.

FIG. 15 shows the actual speed of the DC motor and the detected speed of the encoder (FIG. 15A), the ON control signal (FIG. 15B) and the OFF control signal (FIG. 15C) that are formed based on the detected speed of the encoder caused by these control signals, and the control states (FIG. 15D) in a single operating cycle of the printer.

In the printer, the actual speed of the DC motor will vary as shown in FIG. 15A depending on the load variation that occurs during a single operating cycle, and the encoder detects the detected speed depending on the actual speed. For example, the actual speed of the DC motor decreases when the load is increased and the actual speed of the DC motor increases when the load is decreased.

The speed comparing unit 9*b* compares the detection signal, detected by the encoder, to a reference signal value (vo in FIG. 15 A). The control signal forming unit 9*e* forms an ON control signal for supplying electric power to the DC motor when the detected speed, based on this comparison signal, is lower than the reference speed (FIG. 15B) and stops the supply of electric power to the DC motor when the detected speed is greater than the reference speed (FIG. 15C), and, additionally, performs chopper control for intermittently turning ON and OFF at the point in time of switching from the ON control signal to the OFF control signal, the point in time of switching from the OFF control signal to the ON control signal, or at both points in time (K1 and K2 in FIG. 15B and L1 and L2 in FIG. 15C). Note that the period of time over which this chopper control is performed can be set at will.

In FIG. 15D, the interval over which the ON control signal is outputted corresponds to the ON interval wherein ON control is performed, and the interval over which the OFF control signal is outputted corresponds to the OFF interval over which OFF control is performed, where the interval over which the ON control signal and OFF control signal are generated periodically corresponds to the chopper interval.

As a result, in addition to performing ON control and OFF control based on the speed signal obtained from the encoder that is provided with equally spaced slits, the incorporation of chopper control at the time of switching between this ON control and OFF control makes it possible to achieve three-level control, including chopper control, instead of the two-level control of ON control and OFF control.

While the embodiment described above is an example wherein the speed signal is obtained from an encoder with equally spaced slits, the speed signal may be calculated from another signal, rather than being limited to the encoder.

Figure 16:
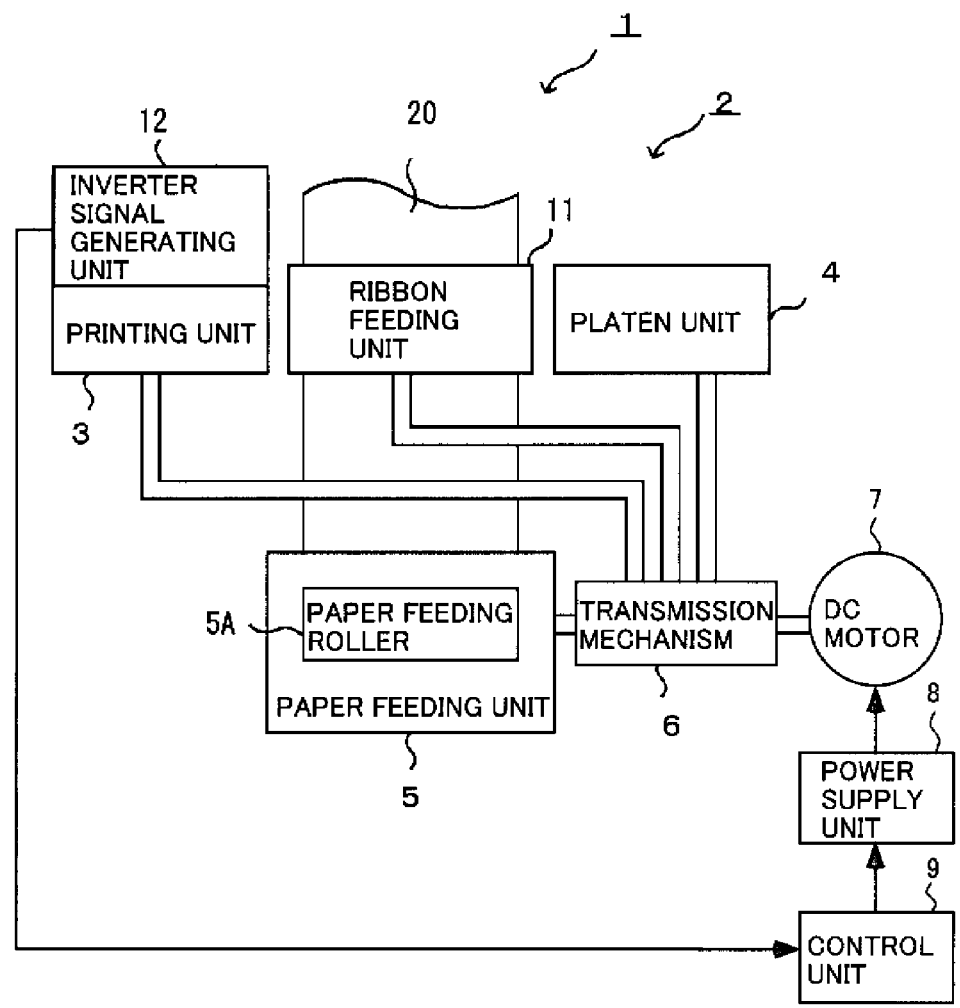
FIG. 16 is a schematic structural diagram for explaining a structure using an inverter signal in the present invention.

FIG. 16 is an example of performing three-level control of ON control, OFF control, and chopper control, in the same manner as in the embodiment described above, based on calculating a speed signal from an inverter signal.

The inverter signal is a timing signal that is used by the printing mechanism 2 in selecting the type, and is a signal that is normally formed and provided so that the printing mechanism 2 can achieve the functions thereof.

The control unit 9 performs three-level control, the ON control, OFF control, and chopper control, in the same manner as in the embodiment described above, by inputting an inverter signal from an inverter signal generating unit 13 and handling this inverter signal as a speed signal.

The invention claimed is:

1. A printer, comprising:
   a DC motor,
   a paper feeding unit including a paper feeding roller that uses the DC motor as the driving source thereof,
   a printing mechanism unit, for printing, using the printing mechanism unit, onto paper that is advanced by a specific amount by the paper feeding unit, an encoder for outputting a pulse signal for speed control of the DC motor according to the rotation of the DC motor,
   a pulse forming region, on the periphery of an encoder plate, for forming pulse signals, and a uniform spacing region, a first non-uniform spacing region and a second non-uniform spacing region provided within the pulse forming region such that said first non-uniform region and said second non-uniform spacing include only those portions of the pulse forming region where spacing changes in such a way as to differ in width from the spacing provided in the uniform spacing region of the pulse forming region,
   wherein the first non-uniform spacing region having spacing wider than the uniform spacing within the uniform spacing region so that the number of pulse signals outputted is fewer than the number of pulses signals outputted by the uniform spacing region when rotating at a constant speed; and
   the second non-uniform spacing region having spacing narrower than the uniform spacing within the uniform spacing region so that the number of pulse signals outputted is greater than the number of pulses signals outputted by the uniform spacing region at a constant speed under the same rotation conditions.

2. A DC motor speed control device for controlling, to a specific speed, a DC motor through feeding back the rotational speed of the DC motor, comprising:
   an encoder for outputting pulse signals according to the rotation of the motor;
   a speed detecting unit for calculating the rotational speed of the motor from the pulse signal from the encoder;
   a speed comparing unit for comparing the speed detected by the speed detecting unit with the specific speed; and
   a control unit for controlling the driving of the DC motor, based on the output of the speed comparing unit, when the rotational speed of the DC motor does not match the specific speed,
   a pulse forming region, on the periphery of an encoder plate, for forming pulse signals, and
   a uniform spacing region, a first non-uniform spacing region and a second non-uniform spacing region provided within the pulse forming region such that said first non-uniform region and said second non-uniform spacing include only those portions of the pulse forming region where spacing changes in such a way as to differ in width from the spacing provided in the uniform spacing region of the pulse forming region,
   wherein the first non-uniform spacing region having spacing wider than the uniform spacing within the uniform spacing region so that the number of pulse signals outputted is fewer than the number of pulses signals outputted by the uniform spacing region when rotating at a constant speed; and
   the second non-uniform spacing region having spacing narrower than the uniform spacing within the uniform spacing region so that the number of pulse signals outputted is greater than the number of pulses signals outputted by the uniform spacing region at a constant speed under the same rotation conditions.

3. A printer, comprising a DC motor, a paper feeding unit including a paper feeding roller that uses the DC motor as the driving source thereof, and a printing mechanism unit, for printing, using the printing mechanism unit, onto paper that is advanced by a specific amount by the paper feeding unit,
   the printer further comprising the DC motor speed control device described in claim 2,
   the speed of the DC motor being controlled by the speed control device.

4. A printer, comprising:
   a DC motor,
   a paper feeding unit including a paper feeding roller that uses the DC motor as the driving source thereof,
   a printing mechanism unit, for printing, using the printing mechanism unit, onto paper that is advanced by a specific amount by the paper feeding unit,
   an encoder for outputting a pulse signal for speed control of the DC motor according to the rotation of the DC motor,
   a pulse forming region, on the periphery of an encoder plate, for forming pulse signals, said pulse forming region is provided with a uniform spacing region, and
   a supplemental plate provided on the encoder plate to cover a portion of said pulse forming region in order to form a non-uniform spacing region,
   wherein said supplemental plate allows for the spacing of the pulse forming region to be changed in such a way as to differ in width from the spacing provided in the uniform spacing region of the pulse forming region of the encoder plate.

5. The printer as set forth in claim 4, wherein said encoder plate and said supplemental plate are gears of the printer.

6. A DC motor speed control device for controlling, to a specific speed, a DC motor through feeding back the rotational speed of the DC motor, comprising:
- an encoder for outputting pulse signals according to the rotation of the motor;
- a speed detecting unit for calculating the rotational speed of the motor from the pulse signal from the encoder;
- a speed comparing unit for comparing the speed detected by the speed detecting unit with the specific speed;
- a control unit for controlling the driving of the DC motor, based on the output of the speed comparing unit, when the rotational speed of the DC motor does not match the specific speed,
- a pulse forming region, on the periphery of an encoder plate, for forming pulse signals, said pulse forming region is provided with a uniform spacing region, and
- a supplemental plate provided on the encoder plate to cover a portion of said pulse forming region in order to form a non-uniform spacing region,
- wherein said supplemental plate allows for the spacing of the pulse forming region to be changed in such a way as to differ in width from the spacing provided in the uniform spacing region of the pulse forming region of the encoder plate.

7. The DC motor speed control device as set forth in claim 6, wherein said encoder plate and said supplemental plate are gears of a printer.

* * * * *